US010178541B2

(12) United States Patent
Carbone et al.

(10) Patent No.: US 10,178,541 B2
(45) Date of Patent: Jan. 8, 2019

(54) SYSTEM AND METHOD FOR POWERING VOICE OVER LONG TERM EVOLUTION (VOLTE) IN LONG TERM EVOLUTION NETWORKS

(71) Applicant: Belgacom International Carrier Services SA (BICS), Brussels (BE)

(72) Inventors: Bayani Carbone, Brussels (BE); Rajarshi Sanyal, Neder Over Heembeek (BE); Pascal Alloin, Keerbergen (BE); Alhad Wakankar, Auderghem (BE); Ricardo Comblez Cavaco, Tournai (BE)

( * ) Notice: Subject to any disclaimer, the term of this patent is extended or adjusted under 35 U.S.C. 154(b) by 70 days.

(21) Appl. No.: 15/375,520

(22) Filed: Dec. 12, 2016

(65) Prior Publication Data

US 2017/0347258 A1 Nov. 30, 2017

Related U.S. Application Data

(60) Provisional application No. 62/266,078, filed on Dec. 11, 2015.

(51) Int. Cl.
| | |
|---|---|
| *H04W 4/00* | (2018.01) |
| *H04W 8/04* | (2009.01) |
| *H04L 29/06* | (2006.01) |
| *H04W 4/24* | (2018.01) |
| *H04W 8/18* | (2009.01) |
| *H04W 84/04* | (2009.01) |
| *H04W 12/06* | (2009.01) |
| *G06Q 30/04* | (2012.01) |

(52) U.S. Cl.
CPC .......... *H04W 8/04* (2013.01); *H04L 65/1016* (2013.01); *H04W 4/24* (2013.01); *H04W 8/183* (2013.01); *G06Q 30/04* (2013.01); *H04L 63/08* (2013.01); *H04W 12/06* (2013.01); *H04W 84/042* (2013.01)

(58) Field of Classification Search
CPC ...................................................... H04W 8/04
USPC ........................................................ 455/433
See application file for complete search history.

(56) References Cited

U.S. PATENT DOCUMENTS 9,609,505 B2 * 3/2017 Ma .......................... H04W 4/14

\* cited by examiner

*Primary Examiner* — Joel Ajayi
(74) *Attorney, Agent, or Firm* — Hinman, Howard & Kattell, LLP; Michael Keenan

(57) ABSTRACT

A method for powering voice over long term evolution (VoLTE) in long term evolution networks. A VoLTE/VoWiFi is centrally enabled for any sized network without implementing an IMS core, but rendering almost the same user experience as standard VoLTE (except voice call continuity). A conventional 2G/3G CS roaming model is enabled for both signaling and media routing. A subscriber profile is cached at a carrier VoLTE platform to enable optimized call routing. A validation mechanism is provided in case IMS AKA authentication is not possible due to an operator not being able to provision authentication vectors via Cx, S6a or MAP interfaces. Terminating access domain selection is implemented whenever an MT call arrives, whereby a T-ADS application server is eliminated. Voice call continuity is implemented whenever a VoLTE customer in a call leaves LTE coverage in favor of 2G/3G coverage. A novel method to actuate call continuity is proposed using a call back and call merge method.

10 Claims, 21 Drawing Sheets

US 10,178,541 B2

SYSTEM AND METHOD FOR POWERING VOICE OVER LONG TERM EVOLUTION (VOLTE) IN LONG TERM EVOLUTION NETWORKS

RELATED PATENT APPLICATION

The present application is related to copending provisional patent application no. 62/266,078 for "A SYSTEM AND METHOD FOR INSTANTLY POWERING VoLTE IN LTE NETWORKS ON LOCAL AND INTERNATIONAL NETWORK ENVIRONMENTS USING THE VoLTE WORLD BRIDGE," filed Dec. 10, 2015, and hereby incorporates the teachings therein by reference. The priority date of said pending application is hereby claimed.

FIELD OF THE INVENTION

This invention relates to long term evolution (LTE) networks and, more particularly, to voice over long term evolution (VoLTE) networks.

BACKGROUND OF THE INVENTION

To help the reader understand the description of the invention, the following abbreviations are provided:

| | |
|---|---|
| (e)SRVCC | (enhanced) Single Radio Voice Call Continuity |
| 2G | $2^{nd}$ Generation Mobile Network |
| 3G | $3^{rd}$ Generation Mobile Network |
| 4G | $4^{th}$ Generation Mobile Network |
| AKA | Authentication and Key Agreement |
| APN | Access Point Name |
| BSS | Business Support System |
| CAMEL | Customized Applications for Mobile networks Enhanced Logic |
| CS | Circuit Switched |
| CSFB | Circuit Switched Fallback |
| CSI | Camel Subscription Identity |
| Diameter CCA | Diameter Credit Control Answer |
| Diameter CCR | Diameter Credit Control Request |
| GERAN | GSM EDGE Radio Access Network |
| HLR | Home Location Register |
| HPMN | Home Public Mobile Network |
| HSS | Home Subscriber Server |
| I-CSCF | Interrogating Call Session Control Function |
| IMPI | IMS Private Identity |
| IMPU | IMS Public Identity |
| IMS | IP Multimedia System |
| IMS-AGW | IMS Access Gateway |
| IMS-ALG | IMS Application Level Gateway |
| IMSI | International Mobile Subscriber Identity |
| LBO-HR | Local Break-Out HPMN Routed |
| LBO-VR | Local Break-Out VPMN Routed |
| LTE | Long Term Evolution |
| MAP | Mobile Application Part |
| MAP ATSI | MAP ANY TIME SUBSCRIPTION INTERROGATION |
| MAP SAI | MAP Send Authentication Info |
| MGCF | Media Gateway Controller Function |
| MNO | Mobile Network Operator |
| MO | Mobile Originating |
| MSISDN | Mobile Station International Subscriber Directory Number |
| MT | Mobile Terminating |
| MVNO | Mobile Virtual Network Operator |
| OCR | Optimal Call Routing |
| O-CSI | Originating Camel Subscription Identity |
| OMR | Optimal Media Routing |
| OSR | Optimal Signalling Routing |
| OSS | Operations Support System |
| OTT | Over-The-Top |
| PBX | Private Branch Exchange |
| P-CSCF | Proxy Call Session Control Function |
| PGW | Packet Gateway |
| IMS PSI | IMS Public Service Identity |
| RAT | Radio Access Technology |
| RAVEL | Local Break-Out VPMN Routed |
| RCS | Rich Communicating Suite |
| R-LBO | Regional Local Break-Out |
| RTCP | RTP Control Protocol |
| RTP | Real-time Transport Protocol |
| S8-HR | S8 Home Routed |
| SBC | Session Border Controller |
| SCC-AS | Service Centralization and Continuity Application Server |
| S-CSCF | Serving Call Session Control Function |
| SIP | Session Initiation Protocol |
| SS | Supplementary Services |
| T-ADS | Terminating Access Domain Selection |
| T-CSI | Terminating Camel Subscription Identity |
| TRF | Transit and Roaming Function |
| TrGW | Transition Gateway |
| UE | User Equipment |
| UTRAN | Universal Terrestrial Radio Access Network |
| VoLTE | Voice over LTE |
| VoWiFi | Voice over WiFi |
| VPMN | Visited Public Mobile Network |
| VT-CSI | Visited Terminated Camel Subscription Identity |

Having launched Long Term Evolution (LTE) a few years ago, the next challenge for mobile service providers is to implement Voice over Long Term Evolution (VoLTE), which relies on the Internet Protocol Multimedia Subsystem (IMS) framework to deliver telephony services over LTE. In VoLTE the emphasis has been placed on Guaranteed Quality of Service which inherently translates into high definition (HD) calling, a service that consumers have come to expect from telephony applications due to the push from Over-The-Top providers (OTTs). Where VoLTE differentiates itself from OTT applications is in the way resources are guaranteed to assure a predictable and consistent service behavior to the consumer. OTT applications on the other hand are offered in a best effort manner, so if resources are scarce the quality of the call may be deteriorated.

The move to VoLTE is a long and complex process and service providers are only now shifting their focus to this technology. Up to now, voice services for devices connected to fourth generation mobile networks (4G) have been rendered through the use of Circuit Switch Fall Back (CSFB) in 3GPP networks. CSFB allows a service provider to re-use its legacy circuit switched infrastructure with minimal integration effort and investment compared to the implementation of a full-fledged IMS core. The drawback of CSFB is the device is forced to switch to 2G or 3G before it can make use of voice services. This means that call setup time is longer than for a pure 2G/3G call since a handover procedure that is part of the call flow and call quality is inferior to VoLTE and HD calling. As development of innovative services is now solely focused on LTE, CSFB is certainly not a viable solution for the future. While CSFB is a stopgap solution, operators eventually look forward to implement an IMS core for next generation telecom applications including VoLTE.

Finally, implementing an IMS core also paves the way for future services such as a Rich Communicating Suite (RCS).

Implementing VoLTE on top of an IMS core is not a trivial task. The IMS framework provides a generic infrastructure capable of supporting any type of multimedia services. The price to pay for this flexibility lies in its complexity to realize. An IMS core comprises of a plethora of network elements each exposing interfaces requiring integration based on Session Initial Protocol (SIP), Real-time Transport Protocol (RTP), or Diameter.

Moreover, the cost of investment is prohibitive. Although IMS promises to power future multimedia services, it is still unclear what those services are, except for VoLTE or how successful they will be in the future. Service providers are thus hesitant to invest resources towards a technology where the commercial viability is still unknown, except for its implementation for voice based services. This is where an international carrier can bring added value by introducing a centralized and multi-tenant IMS solution re-usable for any service provider and tightly integrated with the Evolved Packet Core (EPC) of the operator. This would eliminate the complexity of implementing an IMS core at each Mobile Network Operator (MNO) and would speed up time to market, ensuring service providers are not left behind.

The challenges faced by service operators remain the same, but the responsibility to overcome these obstacles is now transferred to carriers. For example, carriers now need to integrate the IMS located centrally (or over the cloud) with the EPC of the MNO;

end users must be provisioned by the carrier at the IMS-HSS, which needs elaborate integration with the Operations Support System (OSS/BSS) systems of the MNO. The BSS must evolve accordingly to be compatible with VoLTE billing and rating. In case the IMS-HSS is at the MNO end, then the IMS core must have a Diameter (Cx/Sh) interface between the CSCF Application Servers (CSCFs/ASs) and the HSS; and the solution must ensure that local traffic stays local, which can be realized by deploying a local SBC. However, there is no easy way to keep the signaling information for the local traffic confined within the MNO, unless there is a locally deployed IMS core.

Moreover, in order to guarantee quality, privacy, security and flexibility towards customers, a carrier would need to deploy one IMS core per operator which is not practical from a technical and commercial point of view. This is the reason why hosted VoLTE services (hosted by the carrier network) are not particularly popular today. Moreover, it becomes uneconomical to implement this solution for small sized networks and enterprises, as cost and complexity of operations remains almost the same.

Early adopters of VoLTE, however, are faced with a different issue. Having made the investment, these service providers are now able to deliver VoLTE to their subscribers for national use and are eager to offer this service in roaming conditions. But traditional roaming models rely on an IMS core being present at the home and visited network. Given the aforementioned hindrances to introducing an IMS core within a service provider, early adopters are seeking solutions to sidestep the restrictions imposed by the traditional models.

One option is the S8 Home Routed (S8-HR) model where a VoLTE enabled network can capitalize on existing LTE roaming agreements to offer VoLTE services to its roaming out subscribers by forcing all Session Initial Protocol (SIP) and Real-time Transport Protocol (RTP) traffic back to its home IMS network through its home Packet Gateway (PGW). Charging and lawful intercept matters are the main downsides of this model. Moreover, the mouth to ear delay can be high, depending on the location of the Visited Public Mobile Network (VPMN) and Home Public Mobile Network (HPMN).

Another option is to implement a solution platform at the international carrier level which acts as a bridge between the LTE and VoLTE world. The model termed Regional Local Breakout (R-LBO) requires the carrier to implement a partial EPC (i.e., a PGW and PCRF) and a partial IMS core (i.e., a P-CSCF, IMS-ALG, IMS-AGW, IBCF, TrGW) and optionally TRF. With this architecture, the carrier will effectively enable a mobile user belonging to a VoLTE-enabled network to roam in an LTE-only network. The system in this case acts as a cloud bridge between an LTE-enabled visited network and a VoLTE-enabled home network. Billing and lawful interception services at VPMN can be provided by the carrier—services which are difficult to realize via the S8 Home Routing model. Such services at VPMN can also improve the mouth to ear delay of the call. The scope of the solution is only inbound roaming. Interworking and national operations cannot be rendered by the carrier, though a part of the VoLTE infrastructure is mandatory for the setup. This leaves room for reinvention aiming at optimization, broadening of functionalities, and facilitating a cleaner and greener solution.

To circumvent these generic problems faced presently by the mobile industry, it would be advantageous to propose a solution that enables a carrier or operator to deploy VoLTE rapidly for customers without the use of a full-fledged IMS core, thus making the best use of edge and cloud computing.

SUMMARY OF THE INVENTION

In accordance with the present invention, there is provided a method for powering voice over long term evolution (VoLTE) in long term evolution networks. A VoLTE/Voice Over WiFi (VoWiFi) is centrally enabled for any sized network without implementing an IMS core but rendering the almost same user experience as standard VoLTE (except voice call continuity). A conventional 2G/3G CS roaming model is enabled for both signaling and media routing. A subscriber profile is cached at a carrier VoLTE platform to enable optimized call routing. A device validation mechanism is provided in case IMS AKA authentication is not possible due to an operator not being able to provide authentication vectors via Cx, S6a or MAP interfaces. Terminating access domain selection is implemented whenever an MT call arrives, whereby a T-ADS application server is eliminated. Voice call continuity is implemented whenever a VoLTE customer in a call leaves LTE coverage in favor of 2G/3G coverage. A novel method to actuate voice call continuity is proposed using a call back and call merge method.

The intricacy of data structure increases as the mobile network evolves continuously, bringing new features and services. The cloud-based network implementation approaches are facing challenges. First, if all the network related data processing is the sole responsibility of the centralized implementation, the processing resources and the energy requirement at the cloud grows manifold. Moreover, the backhaul cost and the data latency can increase, depending on the distance between the cloud and the edge. This is primarily the reason why the trend is to move towards edge computing. Newer technologies are ushering in, like fog networks.

This invention proposes a novel VoLTE network designed to combine edge and cloud computing, wherein the edge network actuates some basic network related tasks pertaining to national and international operations, and the cloud network at the carrier end executes signaling proxying and caching related tasks. The system actuates edge analytics to filter out international interworking and roaming traffic and routes these call sessions towards the IPX carrier. The edge does not need an IMS implementation, nor the cloud at the carrier, thereby averting the cost and complexity of deploying a full blown IMS/VoLTE network. Rather, it is based on a transmuted lite Private Branch Exchange (PBX) capable of communicating on IMS SIP and RTP. This way, a complete but lite VoLTE network can be realized supporting UNI and NNI related features and interfaces, thereby endorsing national, interworking and roaming operations. Hence, one of the primary benefits of this innovation lies in the fact that a carrier can implement a hosted VoLTE solution along with next generation services like a Rich Communicating Suite (RCS) with a combination of lite centralized network deployment as well as a lite edge, but without implementing a multitenant IMS/VoLTE network which reduces cost and complexity manifold.

One novelty of this invention lies in the fact that the system can actuate the existing 2G/3G signaling and media routing mechanism which was not possible in a standard VoLTE deployment as the S-CSCF which downloads the dynamic subscriber profile (analogue of MSC/VLR for a 2G/3G call) is located in the home network. In standard VoLTE, the signaling (SIP) is always routed back home. This implies a major change in the billing flows and billing implementation across the MNOs. This invention circumvents this issue by proposing a unique way to download the subscriber profile dynamically at the VPMN following the registration process.

The solution can invoke CAMEL triggers to keep parity with the 2G/3G billing system so that the MNO need not actuate a major change in the BSS network design, which makes the leeway for a rapid implementation of VoLTE in the network with minimum changes to the current design.

One of the other major value additions of this innovation is to enable mobile network operators to quick start VoLTE operations in their network without investing in an IMS/VoLTE network, thus reducing risk, cost, and complexity.

Traditionally, SIP/IMS PBXs are limited to implementations in enterprise environments. The present innovation lies in the fact that an evolved version of the PBX with added functionalities is integrated in a novel fashion in a carrier environment to achieve some special objectives, serving both enterprise and operator networks. This system is thus named the VoLTE World Bridge (VoLTE-WB).

The system combines multiple features and functions available in IMS core and some sub-functions of EPC into a single lightweight entity capable of delivering VoLTE services on top of a traditional PBX. This approach allows the international carrier to remain in a pure transit model without having to host an IMS core per customer. The solution has been designed in a fashion that it is easily deployable in networks of any dimensions, including very large networks, mid/small networks, and even small enterprises.

Another key differentiator lies in the fact that, unlike traditional hosted VoLTE solutions where the MNO/carrier must provision and maintain each end user at the HSS, this novel solution eliminates this need, which simplifies manifold the operational processes. In this solution, the end point for the carrier is the VoLTE-WB and the carrier remains agnostic to the actual end user (i.e., the mobile device).

This solution instantly enables VoLTE for national subscribers, roaming-in subscribers, roaming-out subscribers, and also supports VoLTE interworking. The minimal set of functions required to be implemented and exposed by the VoLTE-WB has been identified in order to reach this goal. This reduces the integration work required for interworking with the existing infrastructure and hides much of the complexity of IMS internally within the VoLTE-WB (see FIG. 1). It is also worth mentioning that a standard IMS core has multiple sub-components requiring interfaces in each of these components to enable interworking between them. On the other hand, the VoLTE-WB is one self-contained component, so the processing resources of the hardware (cloud or Customer Premise equipment) is less than that required for a traditional IMS core.

In an MNO/MVNO deployment, VoLTE-enabled user equipment (UEs) do not require any additional applications to avail VoLTE services due to the VoLTE-WB's integration with the customer's EPC. The user can access the services though the native VoLTE client embedded in UEs. However, in an enterprise environment, UEs may require the installation of a client to interact with the VoLTE-WB.

BRIEF DESCRIPTION OF THE DRAWINGS

A complete understanding of the present invention may be obtained by reference to the accompanying drawings, when considered in conjunction with the subsequent detailed description, in which.

Like reference numerals refer to like parts throughout the several views of the drawings.

DETAILED DESCRIPTION OF THE PREFERRED EMBODIMENT

Although the following detailed description contains specific details for the purposes of illustration, those of ordinary skill in the art will appreciate that variations and alterations to the following details are within the scope of the invention. Accordingly, the exemplary embodiments of the invention described below are set forth without any loss of generality to, and without imposing limitations upon, the claimed invention.

The present invention is a method for powering voice over long term evolution (VoLTE) in long term evolution networks. A VoLTE/VoWiFi is centrally enabled for any sized network without implementing an IMS core.

Certain core functionalities are embedded within the VoLTE-WB which enables it to render VoLTE services.

Carrier Provisioning

From an international carrier provisioning perspective, only the VoLTE-WB must be provisioned as an endpoint representing the customer. Individual subscribers need not be provisioned, which is a major benefit when compared to a traditional hosted model.

Call Routing Scenarios

Figure 1:
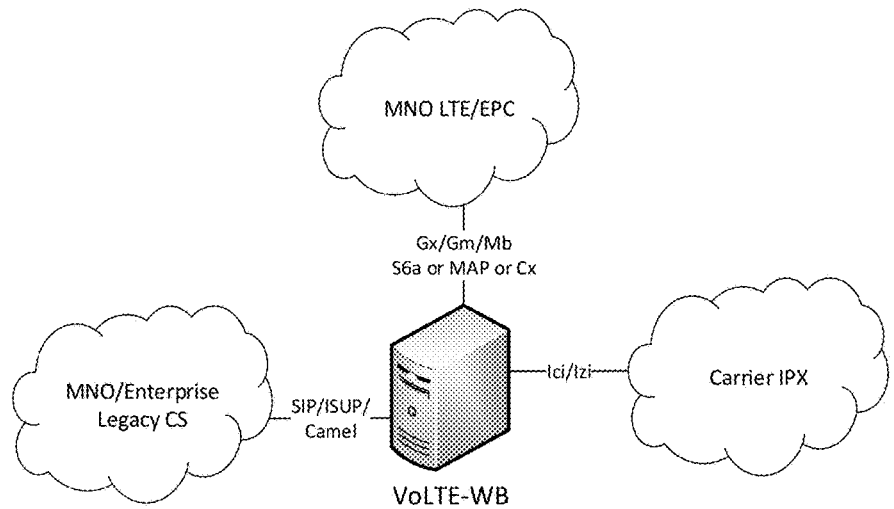
FIG. 1 is a block diagram of a VoLTE-WB system connected to a customer's EPC in accordance with the present invention.
Figure 2:
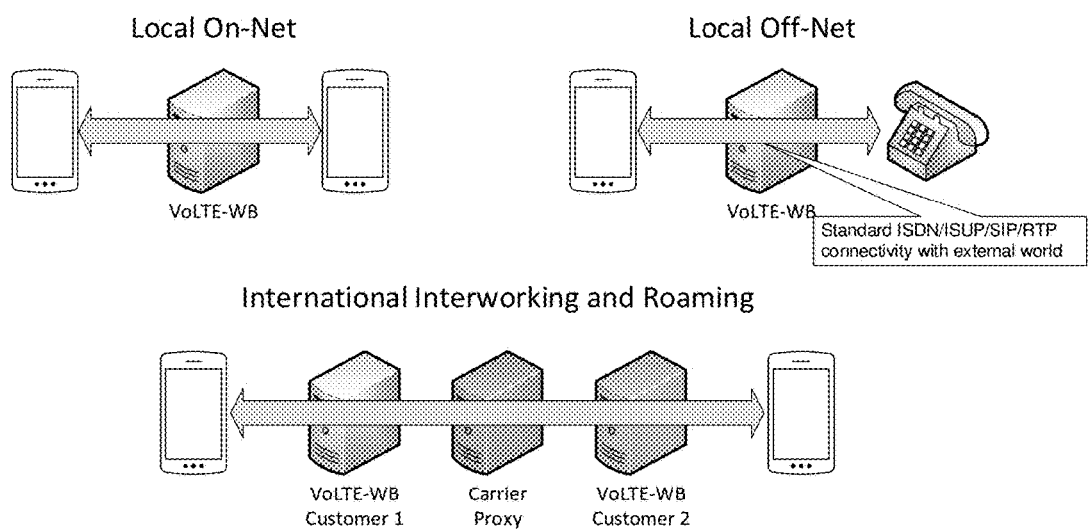
FIG. 2 is a block diagram illustrating local On-Net, local Off-Net, and international interworking and roaming call scenarios.

The international carrier's infrastructure is involved only for international interworking and roaming scenarios. All local on-net/off-net calls are solely handled by the VoLTE-WB. This is in contrast to the traditional hosted model where all signaling and media are required to be routed to the carrier (see FIG. 2).

In addition, the VoLTE-WB enables full optimization of call trajectory for both signaling and media. As a consequence, the current 2G/3G circuit-switched roaming model can be realized through the VoLTE-WB, which is not the case in IMS. When combined with Camel support, this functionality allows the re-use of the current CS billing system. This contrasts with standard VoLTE models where signaling optimization is not possible and where adaptations are necessary to the existing billing system.

Deployment Options

Two deployment models are foreseen. One option is to deploy the solution within a customer-premises equipment (CPE); another is to deploy it in a local/regional cloud-based infrastructure.

Subscriber Device Validation

During VoLTE registration, the UE must be authenticated. The standard procedure for IMS authentication relies on IMS-AKA and is the preferred method if the customer is able to expose a Cx or S6a/MAP interface towards the VoLTE-WB. However, if these interfaces are not available, an alternate method can be used. As the VoLTE-WB embeds a lite PCRF functionality to be integrated with the customer's PGW through a standard Gx interface, the VoLTE-WB is always aware of the mapping: UE IP address (assigned by the PGW) to IMSI. With this information, once the UE's SIP Register message reaches the VoLTE-WB, it can validate that the IMSI included in the registration message (i.e., IMPI) matched with the source IP of the message. In other words the VoLTE-WB is able to validate that the UE is attempting to register using its own IMSI. In order to prevent subscribers from impersonating other users via IP address spoofing, the PGW of the customer will implement source IP validation. That is, the PGW can determine if a subscriber is using a different source IP than what was assigned by the PGW, so the traffic can be dropped.

Terminating Domain Selection

Once a call arrives within the VoLTE-WB, it is necessary for the service logic to determine if the call should be terminated on VoLTE, VoWiFi, or on the legacy circuit switched network. In a standard IMS network, this requires the use of a T-ADS application server along with T-ADS support on HSS and MME/SGSN. In this solution, the functionality is rendered solely by the VoLTE-WB without any special requirements on the EPC network. By leveraging the Gx integration with the customer's PGW, the VoLTE-WB can at all times be aware of the radio network currently serving the subscriber, thus allowing the VoLTE-WB to select the terminating domain accordingly. In order for this information to be available to the VoLTE-WB, it must register to the "Radio Access Technology change" event trigger during the initial Gx session establishment.

For an enterprise deployment, the application is responsible for radio access type tracking. The most popular mobile platforms provide the capability for applications to register to events such as radio access change. This mechanism allows radio access type tracking to be implemented in a similar manner to the MNO/MVNO case.

Voice Call Continuity

As LTE coverage is still not ubiquitous, there will be a need to perform handovers between the packet switched and circuit switched domains mid-call.

In an MNO/MVNO setting and if supported by the operator's existing network, standardized procedures are used for voice call continuity between LTE and GERAN/UTRAN i.e., (e) SRVCC, with the VoLTE-WB rendering the SCC-AS functionality internally.

If (e) SRVCC is not supported by the MNO/MVNO, the radio access tracking mechanism described hereinabove is used as an indicator towards the VoLTE-WB to transition an ongoing call from VoLTE to CS.

In an enterprise setting, the installed client informs the VoLTE-WB once a handover has been performed in order to switch the call from PS to CS. Two possible mechanisms can be implemented in the client to notify the VoLTE-WB that a handover has occurred.

The first relies on RTP control protocol (RTCP), which is used within VoLTE for call quality monitoring and is based on periodic heartbeat messages exchanged during a call. Once the client notices that it is no longer under LTE coverage, it will stop RTCP exchanges. After a configurable amount of missed RTCP heartbeats, the VoLTE-WB can decide to switch the call to CS.

The second mechanism makes use of SIP to proactively send a SIP options message to the VoLTE-WB once the UE is no longer under LTE coverage, triggering a shift to CS by the VoLTE-WB.

Lawful Interception and Emergency Services

In many countries it is mandatory that lawful interception remains within the boundaries of the country. In a traditional hosted environment, this can be difficult to accomplish if the solution is hosted centrally or in the cloud. With the present solution, lawful Interception can be achieved easily by rendering the functionalities directly on the VoLTE-WB platform. The same holds true for emergency services.

Additional Uses

In case only VoLTE roaming must be enabled so that a VoLTE operator (Home Networks) can offer roaming for its VoLTE customers in a non-VoLTE (but LTE) market (Visited Networks), the VoLTE-WB solution can be implemented only to enable roaming by blocking the national operations or interworking scenarios for the visited network.

The VoLTE-WB can also be integrated with a Rich Communication Services Application Server (RCS AS) to offer advanced communication services. To achieve this, the VoLTE-WB is capable of supporting additional protocols such as MSRP.

Dynamic Subscriber Provisioning

For deployments integrated within an MNO/MVNO network, no additional provisioning is required. The VoLTE-WB simply takes advantage of existing 2G/3G/4G HLR/HSS provisioning mechanisms by downloading relevant subscriber information on demand from the HLR/HSS through the MAP or Cx/Sh interface. The VoLTE-WB uses this HLR/HSS interface in order to authenticate, authorize (i.e., permits the presence of teleservices and supplementary services), and identify the services configured for a subscriber. This information is dynamically downloaded by the VoLTE-WB during subscriber registration, so no provisioning is required ahead of time.

If the MNO/MVNO is integrated via 2G/3G/EPC HLR/HSS (i.e., not via IMS HSS) and wants to control access to VoLTE services, it can do so by controlling the IMS APN provisioning of its subscribers in its EPC HSS.

In an enterprise deployment, a one-time bulk provisioning of all subscribers' MSISDNs is required. At registration, SMS or Voice validation of the MSISDN is performed through the downloaded application in order to authenticate and authorize a subscriber on the VoLTE-WB.

2G/3G CS Billing System Preservation

The novelty of the present invention, among others, lies in the fact that the system can actuate the existing 2G/3G signaling and media routing mechanism, which was not possible in a standard VoLTE deployment, as the S-CSCF which downloads the dynamic subscriber profile (analogue of MSC/VLR for a 2G/3G call) is located in the home network.

In standard VoLTE, the signaling (SIP) is always routed back home. This implies a major change in the billing flows and billing implementation across the MNOs. This invention circumvents this issue with a unique way to download the subscriber profile dynamically at the VPMN following the registration process.

The solution can invoke CAMEL triggers to keep parity with the 2G/3G billing system so that the MNO need not actuate a major change in the BSS network design, which allows a rapid implementation of VoLTE in the network with minimum changes to the current design.

Roaming Procedures

Before the roaming registration, P-CSCF discovery occurs using a standard procedure following one of two options:

a. Within the GTP Create Session Response, the PGW at VPMN populates the Protocol Configuration Options (PCO) parameter where it includes the IP address/hostname of the VPMN's Proxy Call Session Control Function (P-CSCF). The P-CSCF address/hostname identifies the VoLTE-WB, which is the first touch point for the UE.

b. Learning the P-CSCF address by DHCP mechanism.

Once the VoLTE-WB address (at VPMN) is learned by the UE, it commences the REGISTER operation.

During the Registration process, the VoLTE-WB may indicate its own identity in the SIP REGISTER using the Public Service Identity (PSI) parameter to aid the Carrier VoLTE platform in identifying this special VoLTE-WB, as opposed to a standard IMS network. This can also be statically configured within the Carrier VoLTE platform.

The REGISTER message is routed towards the preconfigured Carrier VoLTE platform. The Carrier VoLTE platform receives the REGISTER message and caches the information in the local SIP Registrar inbuilt in the Carrier VoLTE platform.

During the REGISTER, the PATH header is registered in the SIP Registrar. This may be used for Optimal Media/Signaling Routing (OMR/OSR).

Before forwarding the REGISTER towards the Home Network, the Carrier VoLTE platform performs a check based on static configuration to verify if the home network has a standard IMS implementation from an OEM, or if it has a similar kind of VoLTE setup realized by the specially designed VoLTE-WB.

In case the Home Network is a VoLTE-WB, the Carrier VoLTE platform transparently passes on the PSI parameter it has received in the ingress REGISTER or this PSI can be generated by the Carrier VoLTE platform itself based on static configuration. This information is required by the HPMN VoLTE-WB to format the NOTIFY message accordingly as described hereinbelow.

In case the Home Network is a standard IMS network, the Carrier VoLTE platform deletes the PSI parameter before forwarding the SIP REGISTER towards the HPMN.

The home network VoLTE-WB can have either inbuilt lite IMS HSS or, with no inbuilt HSS, VoLTE-WB integrates with the EPC/IMS HSS or 2G/3G HLR of the MNO/MVNO.

The MNO/MVNO 2G/3G HLR is used to retrieve voice subscriber profiles and may also be used for authentication. The IMS HSS may be used not only for authentication purposes, but also as subscriber profile repository if the MNO/MVNO wishes to provision such additional data. The EPC HSS may be used only for authentication purposes to retrieve 3G authentication vectors as it does not hold any voice subscriber profile.

Once the registration has been accepted, and if the HPMN learned from the REGISTER message that the VPMN is a VoLTE-WB, it will include its own PSI in the 200 OK to inform the VPMN VoLTE-WB that HPMN is also using VoLTE-WB. This information is necessary for the VPMN VoLTE-WB in order to decide during a call if optimization of signaling and media routing is possible or if a standard IMS roaming model must be followed.

Following this, a SUBSCRIBE-NOTIFY process is realized in order to download the subscriber profile towards the VPMN VoLTE-WB, which, combined with the knowledge that the HPMN is also a VoLTE-WB, allows the VPMN VoLTE-WB and the Carrier VoLTE platform to optimize signaling and media routing.

Three Scenarios for Registration

Registration Scenario 1: VoLTE REGISTRATION between VoLTE-WB (A) at VPMN and VoLTE-WB (B) at HPMN, VoLTE subscriber from Network B roaming in Network A, Network B has a standalone IMS HSS along with a 2G/3G HLR.

Refer to the call flow, the REGISTER is invoked by the Roaming UE in Network A, routed via VoLTE-WB A at VPMN A and reaches via the Carrier VoLTE platform, the VoLTE-WB B.

In case of a standard VoLTE registration, the I-CSCF of an IMS network first invokes a UAR towards HSS. But in this solution, UAR need not be invoked by the VoLTE-WB (at HPMN) because no S-CSCF address must be learned by the entity.

The VoLTE-WB invokes a MAR over the Cx interface in order to retrieve the IMS-AKA authentication vectors from the IMS HSS. This use case relies on the IMS HSS solely for IMS authentication purposes, allowing lightweight IMS HSS provisioning restricted to authentication information as the remaining subscriber profile information can be downloaded dynamically from the 2G/3G HLR during the registration process as described hereinbelow. Additional IMS profile data such as IFCs, supplementary services, AS specific data may be provisioned by the HPMN within the IMS HSS, but this is completely optional.

Figure 3:
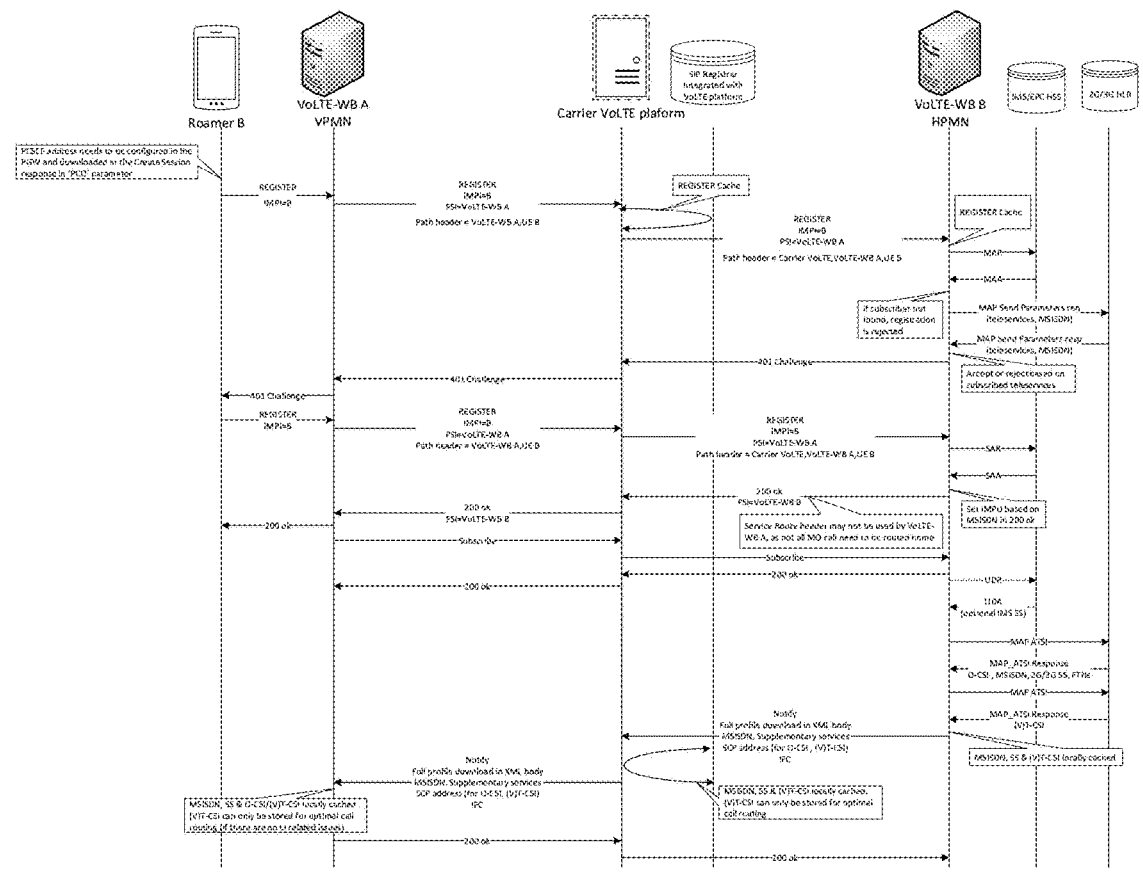
FIG. 3 is a flow chart illustrating a first VoLTE registration scenario.

FIG. 3 demonstrates the scenario where the VoLTE-WB interworks with the external IMS HSS and 2G/3G HLR. The interaction with the IMS HSS is over the Cx interface using Diameter messages like MAR/MAA and SAR/SAA. If the IMS HSS does not return any authentication data, then the registration is rejected.

The VoLTE-WB sends a MAP SEND PARAMETERS request towards the 2G/3G HLR in order to retrieve the subscriber's teleservices and MSISDN. Based on the returned set, the registration is rejected or allowed to proceed. Absence of speech teleservice, TS11, could trigger a rejection.

Once the second REGISTER request is authenticated and authorized by the IMS HSS, the VoLTE-WB sends back a 200 OK containing an IMPU derived from the MSISDN it retrieved earlier.

After the Registration process is completed, the VPMN (VoLTE-WB A) invokes a SUBSCRIBE message, routed via the Carrier VoLTE platform, reaching HPMN (VoLTE-WB B).

As mentioned hereinabove, the subscriber profile must be downloaded from the IMS/2G/3G HSS/HLR towards the VPMN (i.e., VoLTE-WB A) via VoLTE-WB B (HPMN).

If the HPMN wishes to maintain subscriber profile information, such as supplementary services and Camel triggers within its IMS HSS, the VoLTE-WB B invokes a UDR to download this information.

Alternatively, the VoLTE-WB B at HPMN invokes some SS7 MAP ATSI messages towards the HLR to download the Camel Subscription IDs, MSISDN, supplementary services, and the call forward numbers pertaining to different call forward options.

Multiple ATSIs (at least two) must be invoked, as one MAP ATSI can return only one CSI (either originating or terminating).

Following the download of the CSIs from the HLR, the VoLTE-WB generates a NOTIFY where it populates the MSISDN, supplementary services (pertaining to 3G service), as well as the O-CSI and (V)T-CSI towards the VoLTE-WB A.

CAMEL T-CSI is normally not statically downloaded to the V-MSC during Location Update. Rather, it is dynamically downloaded by the HLR to the Gateway MSC during a terminating call. In this case however, T-CSI is statically downloaded during VoLTE registration if the subscriber is in a roaming network. Thus, if a VoLTE terminating call arrives (Invite) at the visited VoLTE-WB, it can actuate a CAMEL trigger to the SCP. However, if CAMEL Phase 3 is available at home network, then T-CSI will not be downloaded. Rather, VT-CSI is downloaded from the HLR to the VoLTE-WB.

The VoLTE-WB A subsequently generates a 200 OK to terminate the process.

Registration Scenario 2: VoLTE REGISTRATION between VoLTE-WB (A) at VPMN and VoLTE-WB (B) at HPMN, VoLTE subscriber from Network B roaming in Network A, VoLTE-WB B has an integrated SIP REGISTRAR (acting as a LITE IMS HSS) and a standalone 2G/3G/EPC HLR/HSS.

Figure 4A:
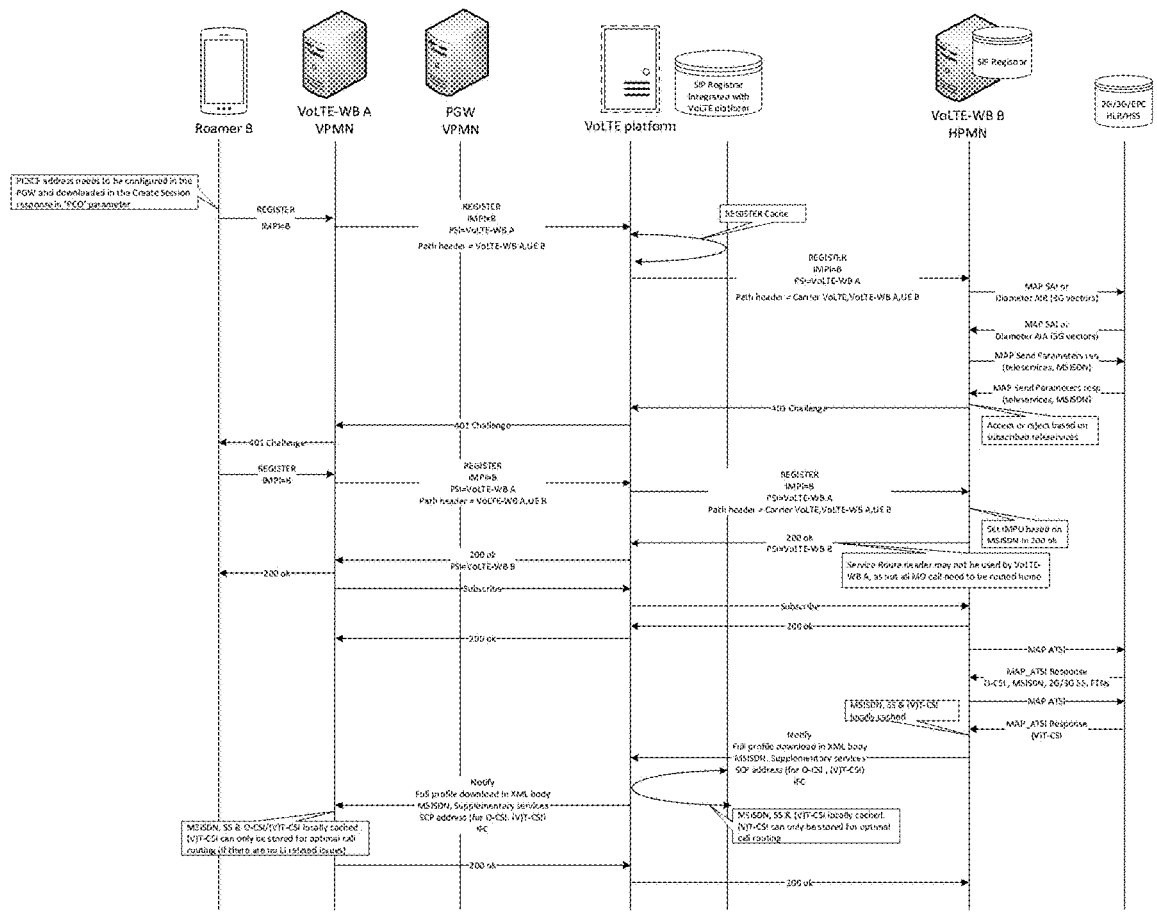
FIGS. 4a and 4b, taken together, are a flow chart illustrating a second VoLTE registration scenario.
Figure 4B:
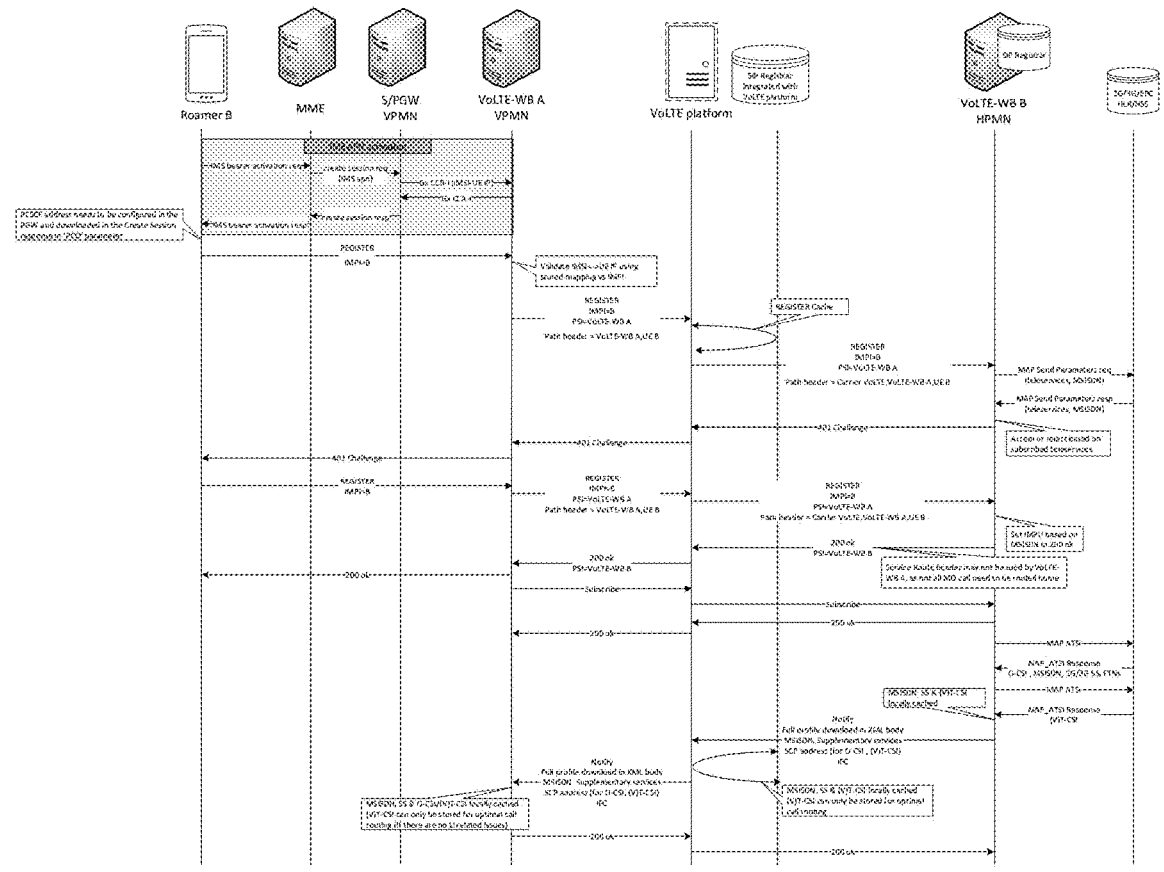

FIGS. 4a and 4b demonstrate a situation where the IMS HSS is not present in the home network but is an inbuilt functionality in the VoLTE-WB. In this case, there is a new functionality: the SIP Registrar acting as a lite IMS HSS.

There are some implications/side effects of not integrating with an external IMS HSS belonging to the home network. One implication is the handling of the IMS authentication process.

The authentication process for LTE (4G) and IMS are not compatible. But the IMS AKA authentication and the 3G authentication processes are identical. So it is possible to invoke a MAP SAI or DIAMETER AIR (3G vectors) message towards the HLR/HSS to retrieve the authentication parameters. This is illustrated in FIG. 4a.

But this may have a collateral impact. If there is a fraud management process spawned within the HLR/HSS or available externally, then the invocation of an AIR/SAI from the HPMN zone can be perceived as fraud if there had been a SAI/AIR invoked previously (e.g., a few minutes or hours before) from another country where the roamer is located presently. Hence, using the MAP SAI/DIAMETER AIR for authentication can be implemented on a case by case basis.

The other approach, which is fail safe and robust, is described hereinbelow and is illustrated in FIG. 4b.

Prior to VoLTE registration, the VPMN PGW will have received a "create session request" for the IMS APN which will have triggered a Gx CCR-I towards the VoLTE-WB A. This CCR-I includes the IMSI and the UE IP address. This mapping is stored within the VoLTE-WB A for future UE validation.

When the REGISTER arrives at the VoLTE-WB A, it uses the mapping it stored during IMS bearer creation in order to validate that the IMSI (used as IMPI) populated in the REGISTER matches the IP that the UE is using. If the REGISTER is valid, VoLTE-WB A forwards the request to the Carrier VoLTE platform; otherwise it rejects the registration request.

This is not a complete substitute of the IMS authentication process, but an elegant way to ascertain that the REGISTRATION request is from a genuine VoLTE subscriber that has already been authenticated and registered by the LTE core network.

Additionally, the PGW must ensure that the source IP set in the IP packet carrying the REGISTER message matches the UE IP assigned previously during the IMS bearer setup for that subscriber. The PGW also must ensure that the IP packet carrying the REGISTER message arrives on the specific default bearer for IMS signaling (QCI 5) that has been set up during the GTP session creation.

In any case, once the registration reaches VoLTE-WB B, it sends a MAP SEND PARAMETERS request towards the 2G/3G HLR in order to retrieve the subscriber's teleservices and MSISDN. Based on the returned set, the registration is rejected or allowed to proceed. Once again, absence of speech teleservice, TS11, could trigger a rejection.

The VoLTE-WB B (HPMN) then sends a 200 OK containing an IMPU derived from the MSISDN towards VoLTE-WB A (VPMN) indicating a successful VoLTE registration.

As mentioned hereinabove, the subscriber profile then must be downloaded from the 2G/3G HSS towards the VPMN (i.e., VoLTE-WB A) via HPMN (i.e., VoLTE-WB B). This is performed via the exchange of the SUBSCRIBE-NOTIFY messages.

After the Registration process is completed, the VoLTE-WB A invokes a SUBSCRIBE message, routed via the VoLTE platform and reaching the VoLTE-WB B.

The VoLTE-WB B at HPMN invokes some SS7 MAP ATSI messages to download the Camel Subscription IDs, MSISDN, supplementary services, and the call forward numbers pertaining to different call forward options.

Multiple ATSIs (at least two) must be invoked as one MAP ATSI can bring back only one CSI (either originating or terminating).

Following the download of the CSIs from the HLR, the VoLTE-WB generates a NOTIFY where it populates the MSISDN, supplementary services (pertaining to 2G/3G service), as well as the O-CSI and (V)T-CSI towards the VoLTE-WB A.

CAMEL T-CSI is normally not statically downloaded to the V-MSC during Location Update. Rather, it is dynamically downloaded by the HLR to the Gateway MSC during a terminating call. In this case, however, T-CSI is statically downloaded during VoLTE registration if the subscriber is in a roaming network. Thus, if a VoLTE terminating call arrives (Invite) at the visited VoLTE-WB, it can actuate a CAMEL trigger to the SCP. However, if CAMEL Phase 3 is available at the home network, then T-CSI is not downloaded. Rather, VT-CSI is downloaded from the HLR/HSS to the VoLTE-WB.

The VoLTE-WB A subsequently generates as 200 OK to terminate the process.

Registration Scenario 3: VoLTE REGISTRATION between VoLTE-WB (A) at VPMN and standard IMS Network (B) at HPMN, VoLTE subscriber from Network B roaming in Network A.

Figure 5:
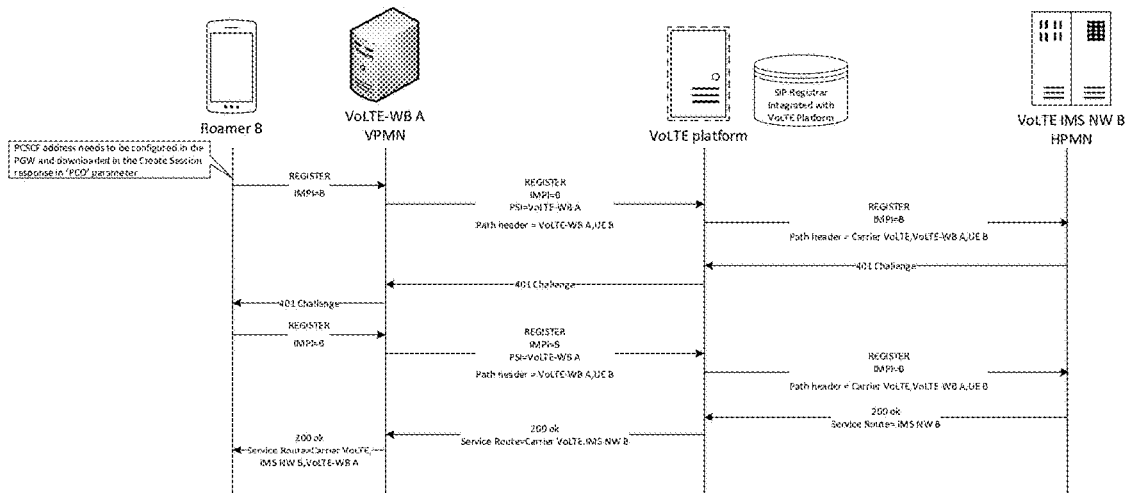
FIG. 5 is a flow chart illustrating a third VoLTE registration scenario.

As shown in FIG. 5, VPMN A uses the VoLTE-WB A but the home network has a standard IMS network.

The REGISTER from the VoLTE-WB A bears the PSI pertaining to the VoLTE-WB A, but this has no significance for the home network as it is a standard IMS network.

PSI parameter is useful to detect that the contracting parties have the specially designed VoLTE-WB in purview of this solution.

But if one of the ends uses a standard IMS network, this parameter is suppressed by the Carrier VoLTE platform.

The Carrier VoLTE platform holds the configuration type of the network (standard VoLTE IMS or VoLTE-WB) when the network is provisioned in the system. In this particular case, the IMS network receives a REGISTER message and responds with an authentication challenge as per the standard IMS/VoLTE UE registration mechanism.

The rest of the registration flow in FIG. 5 pertains to the standard IMS registration procedure.

Figure 6:
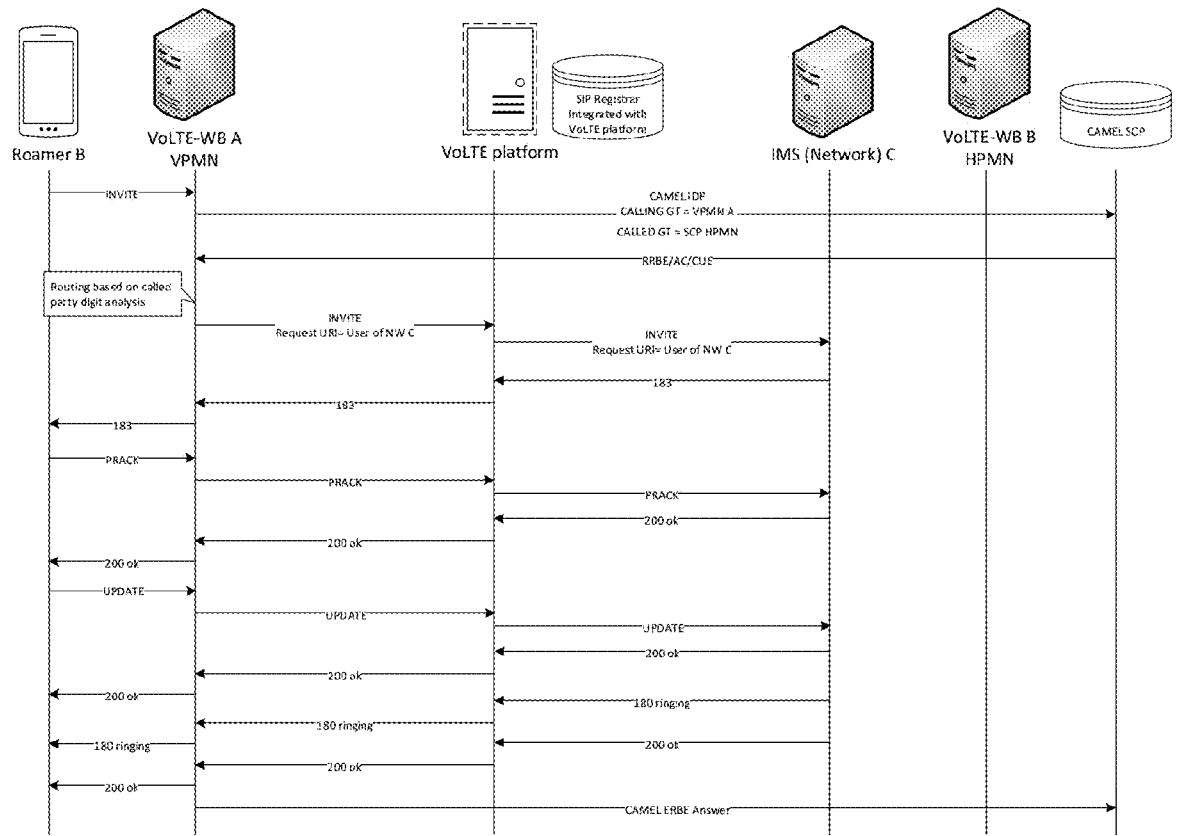
FIG. 6 is a flow chart illustrating a first VoLTE call scenario.

Call Scenario 1: VoLTE MO call from prepaid user from HPMN B (VoLTE-WB B), now roaming in VPMN A (VoLTE-WB A) and placing a call towards a standard IMS network C FIG. 6 demonstrates the mechanism followed for a MO call towards IMS network C. Roamer B places a VoLTE MO call and the INVITE arrives at the VoLTE-WB A. The VoLTE-WB A determines that there is an O-CSI flag downloaded during the VoLTE registration process. The VoLTE-WB A invokes the CAMEL trigger towards the CAMEL SCP at the home network.

Following a successful authentication and authorization, the SCP generates the RRBE/Apply Charging/Continue. Further, the VoLTE-WB A progresses the call towards IMS network C via the Carrier VoLTE platform.

No SIP signaling is routed towards the HPMN. The signaling is directly routed toward IMS network C, just as the 2G/3G call model.

Service Route header derived from the 200 OK from the Registration dialogue is not used here, as the SIP signaling is not routed toward the HOME NETWORK.

In a traditional VoLTE MO call, the Route header in the INVITE is derived from the Service Route header of the 200 OK from the registration dialogue which bears the S-CSCF address of the home IMS network. But the Service Route field has no significance here.

The SIP messages continue as per the standard VoLTE SIP call flow for a MO call with preconditioning enabled. The creation of the GTP dedicated bearer for the voice (QCI=1) is not shown in this call flow, but there is no deviation from standard, so that part has been omitted.

When the VoLTE-WB B receives the Answer from the called party, it generates a 200 OK and routes it towards the VoLTE-WB A.

The VoLTE-WB A generates the CAMEL ERBE towards the CAMEL SCP at home network.

The call continues as per standard IMS SIP/RTP method for a MO call and the CAMEL MO leg is actuated in parallel.

Figure 7:
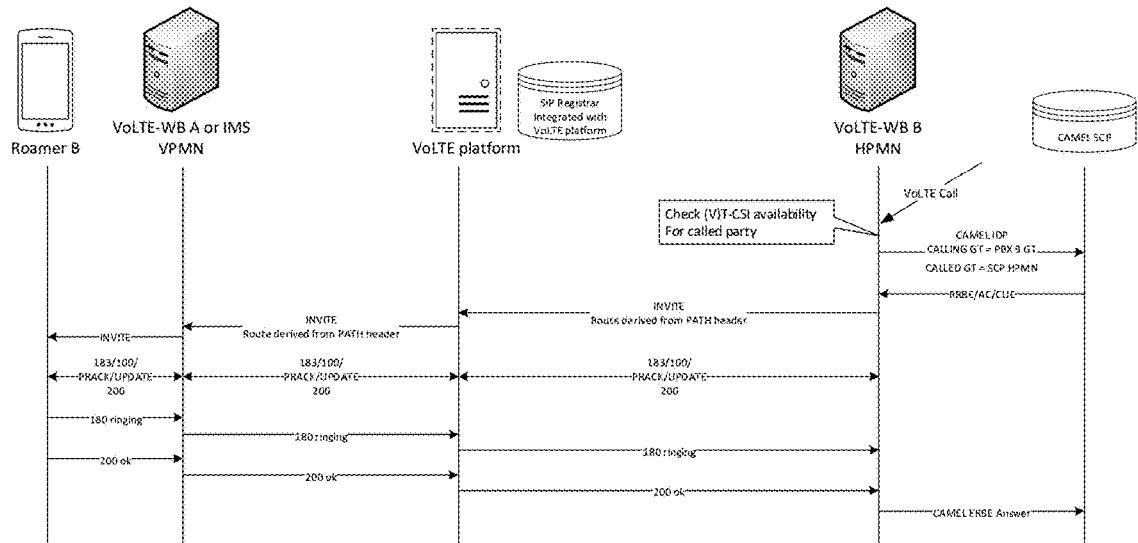
FIG. 7 is a flow chart illustrating a second VoLTE call scenario.

Call Scenario 2: VoLTE MT call towards prepaid user from HPMN B (VoLTE-WB B), now roaming in VPMN A (VoLTE-WB A or Standard IMS), calling party being a subscriber from HPMN B As illustrated in FIG. 7, the call reaches the VoLTE-WB in the home network B. The Home network B finds a CAMEL (V)T-CSI flag in the dynamic profile of the subscriber. This (V)T-CSI flag was registered during the IMS registration phase.

The VoLTE-WB B actuates a CAMEL MT leg (CAMEL IDP) towards the CAMEL SCP at the home network for the authentication and authorization process.

Upon successful authentication and authorization, the CAMEL SCP routes the RRBE/Apply charging and Continue for the roaming MT leg towards the VoLTE-WB B.

The SIP INVITE is routed from the VoLTE-WB B at HPMN B towards VPMN A on the basis of the Path header registered at the VoLTE-WB B during the registration process. This follows the standard IMS MT leg call flow.

As the Path header had been manipulated by the Carrier VoLTE platform during the VoLTE registration (by adding its own entry), the SIP dialogues flow through the Carrier VoLTE platform.

Call Scenario 3: VoLTE MT call towards prepaid roamer from HPMN B (VoLTE-WB B), now roaming in VPMN A (VoLTE-WB A), call lands at the Carrier VoLTE Platform.

Figure 8:
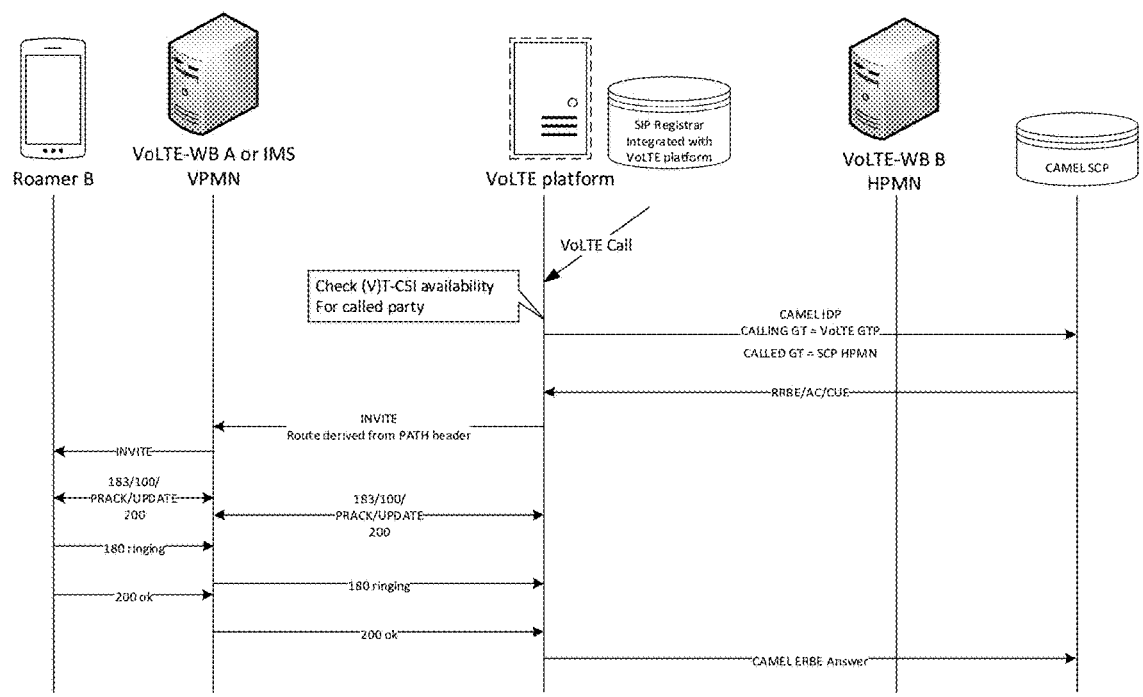
FIG. 8 is a flow chart illustrating a third VoLTE call scenario.

Referring now to FIG. 8, the call reaches the Carrier VoLTE Platform (sitting in the transit environment). The Carrier VoLTE platform finds a CAMEL (V)T-CSI flag in the dynamic profile of the subscriber. This (V)T-CSI flag was cached at the Carrier VoLTE platform during the IMS registration phase.

The Carrier VoLTE platform actuates a CAMEL MT leg (CAMEL IDP) towards the CAMEL SCP at the home network for the authentication and authorization process. Upon successful AA, the CAMEL SCP routes the RRBE/Apply charging and Continue for the roaming MT leg towards the Carrier VoLTE Platform.

Further, the SIP INVITE is routed from the Carrier VoLTE platform directly towards VPMN A on the basis of the Path header registered at the Carrier VoLTE platform during the registration process. This follows the standard IMS MT leg call flow between the carrier and the VPMN.

As supplementary services had already been registered in the Carrier VoLTE platform during the VoLTE registration, such services can be used directly for the SS invocation.

Media is anchored in the Carrier VoLTE platform.

This method enables OCR (optimal call routing) for both signaling and media plane which is not possible with standard IMS models.

Call Trajectory Depending on Network Deployments

Different call routing scenarios including potential optimizations depend on the type of VoLTE network deployed by the various MNOs (i.e., VoLTE-WB or standard IMS).
  a. In all cases, subscribers of HPMN-A and HPMN-B are roaming.
  b. In all cases where the VPMN and HPMN are both using the VoLTE-WB, real-time billing can be rendered via Camel re-using the existing billing infrastructure.
  c. Cases where both subscribers are roaming in the same visited network.
  d. Cases where each subscriber is roaming in a different visited network.

While optimized media routing is feasible within current IMS specifications, signaling routing optimization is not possible. That is, signaling always must flow through the home S-CSCF of the subscriber.

The Carrier VoLTE platform can also play a role in optimizing signaling and media routing due to subscriber profile caching it performs during IMS registration.

Figure 9A:
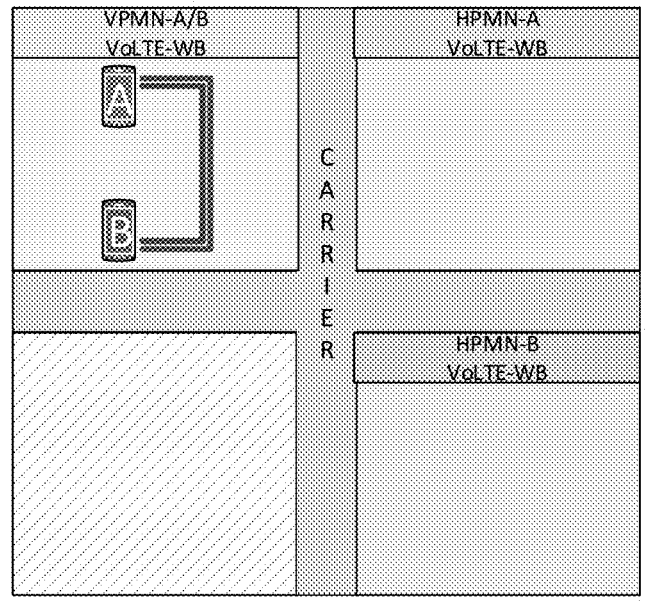
FIGS. 9a through 9o illustrate signaling and media optimizations for various routing.
Figure 9B:
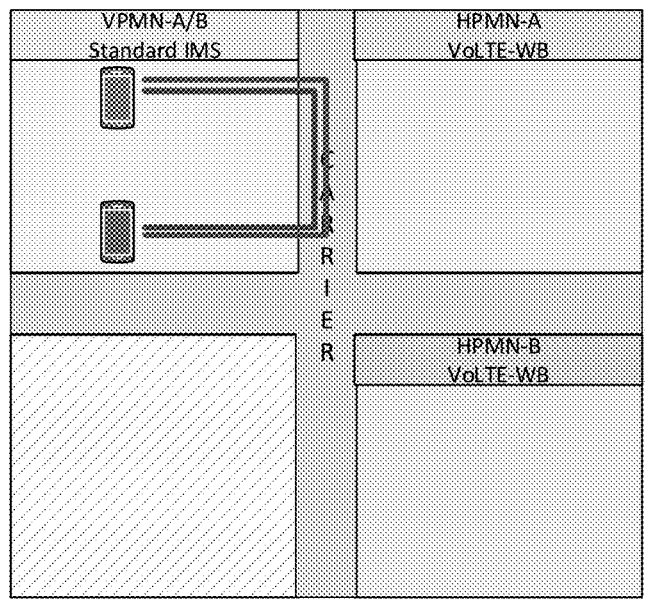
Figure 9C:
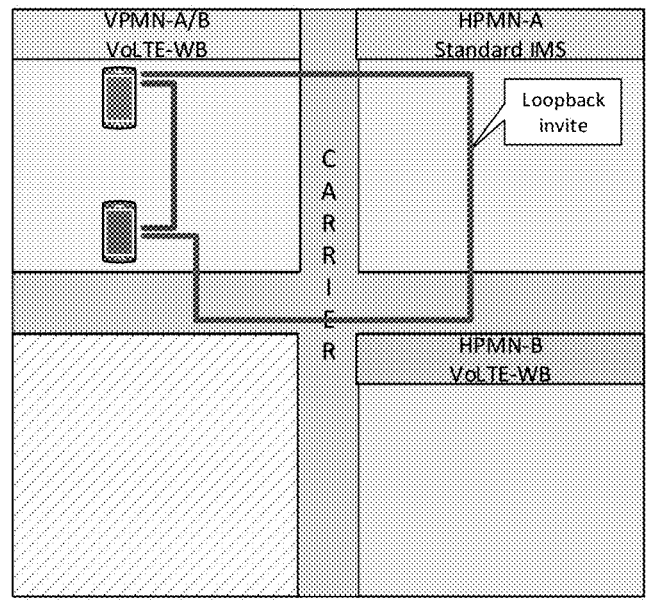
Figure 9D:
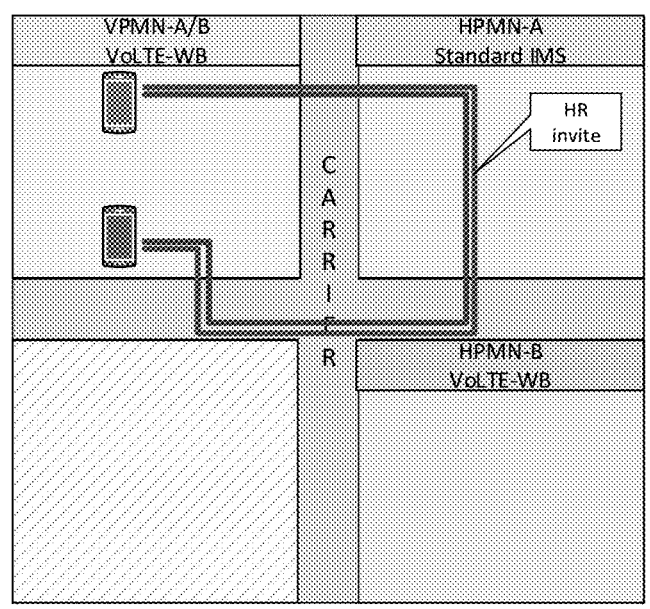
Figure 9E:
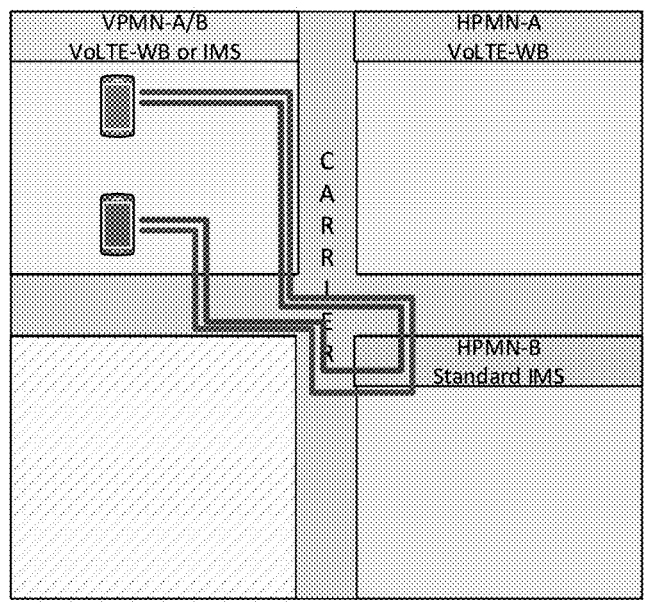
Figure 9F:
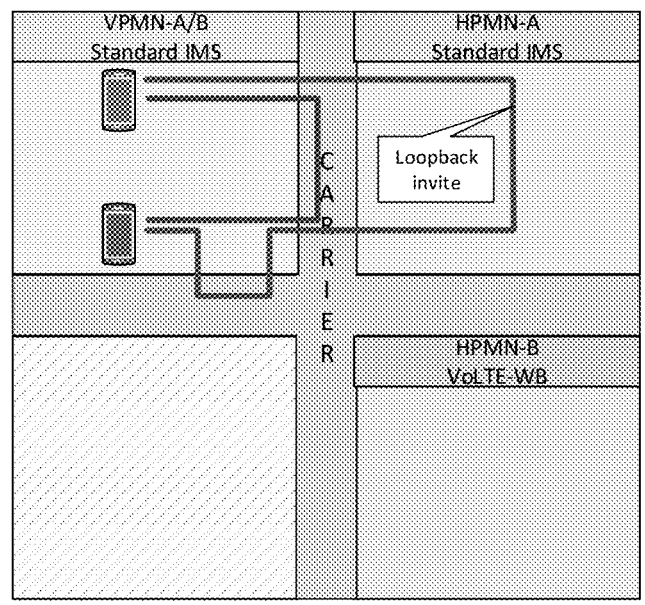
Figure 9G:
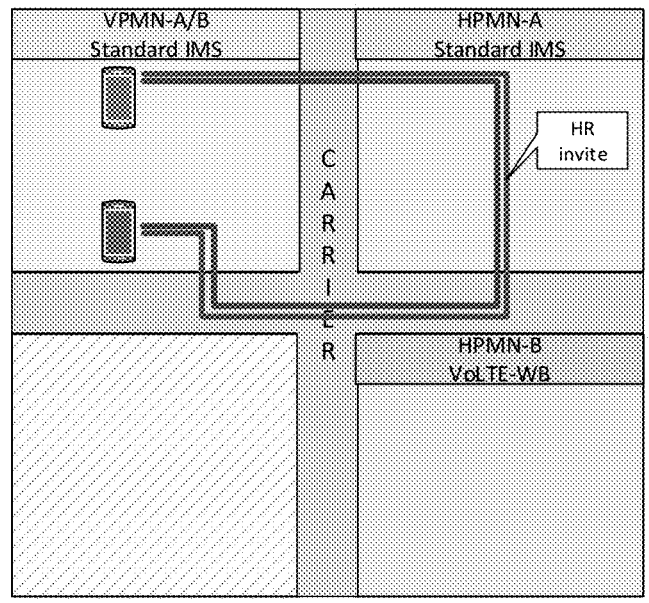
Figure 9H:
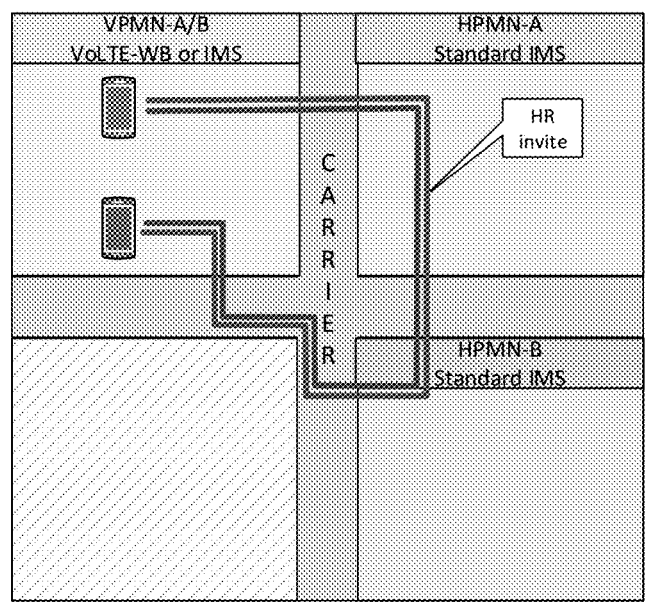
Figure 9I:
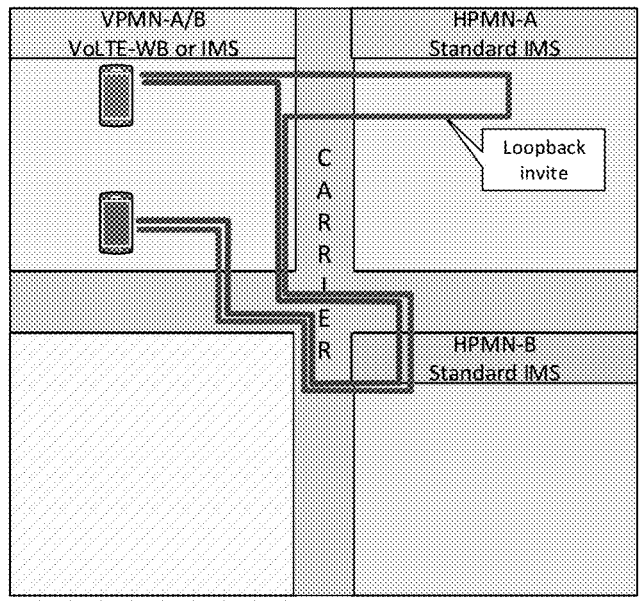
Figure 9J:
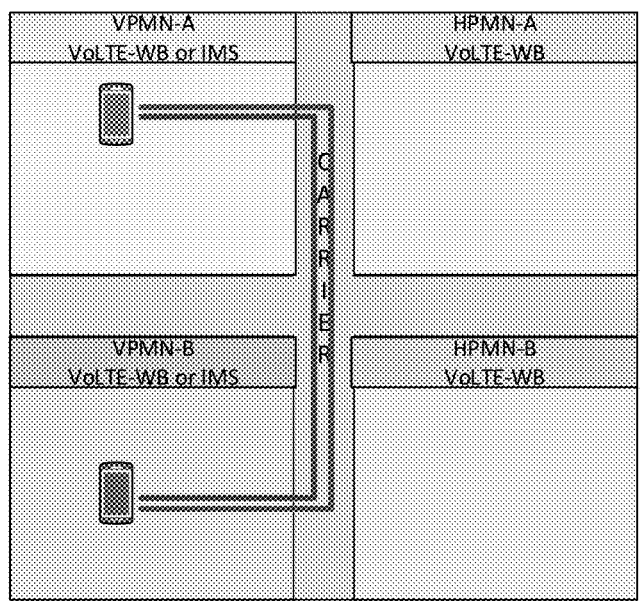
Figure 9K:
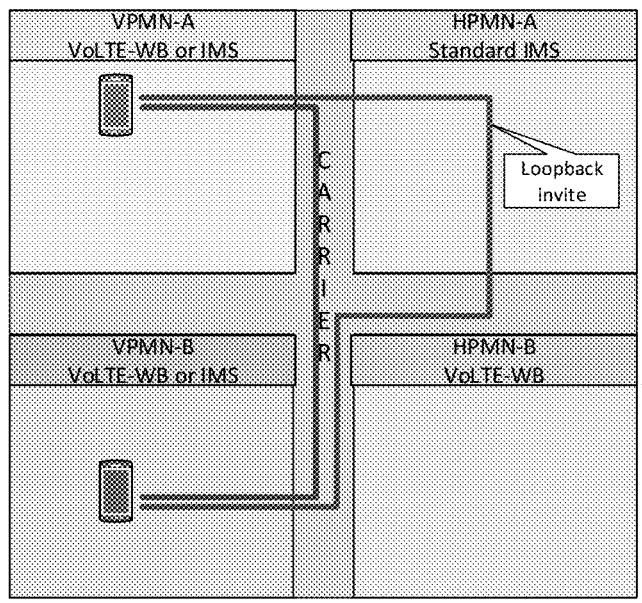
Figure 9L:
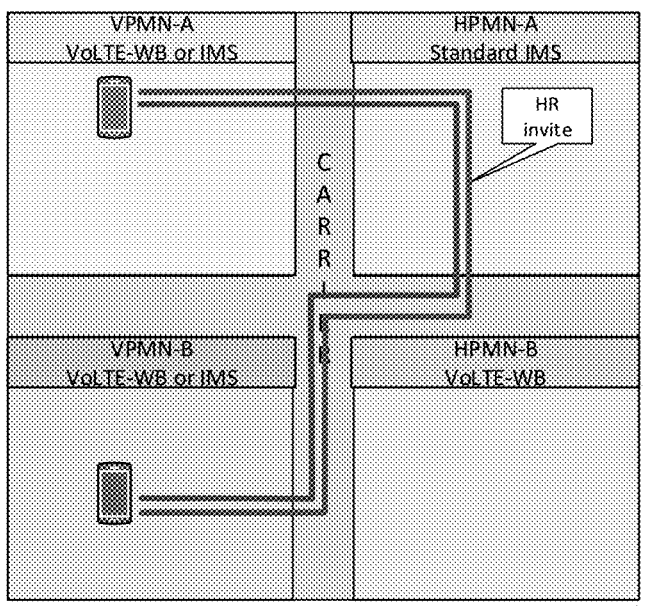
Figure 9M:
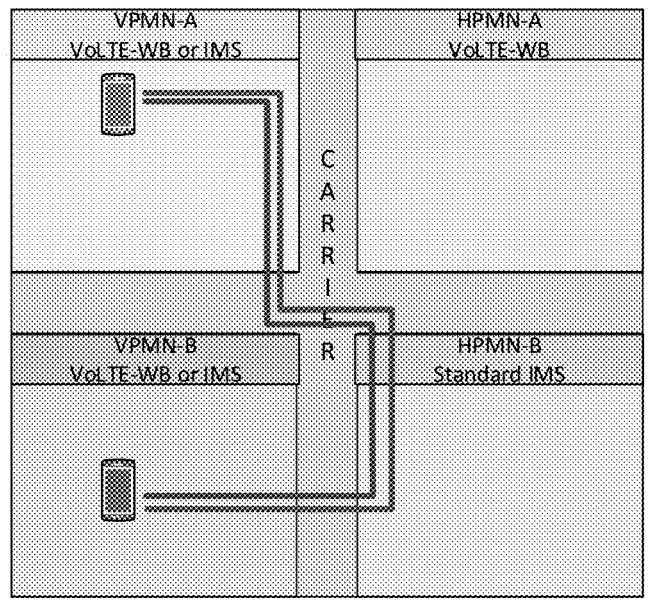
Figure 9N:
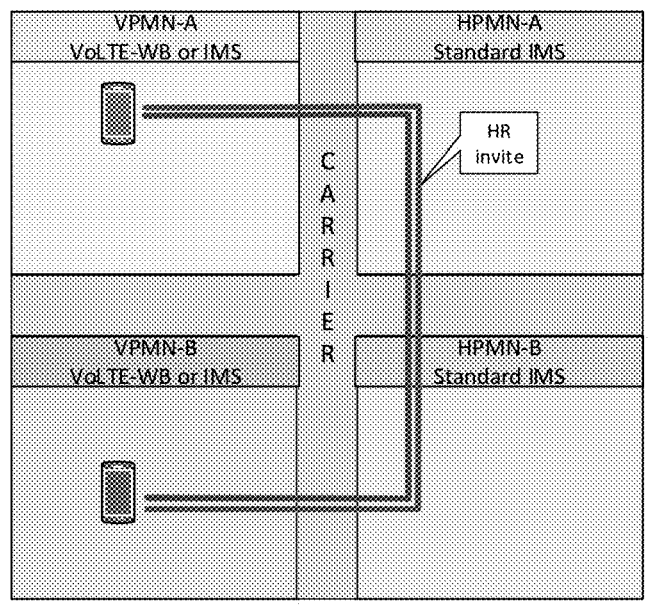
Figure 9O:
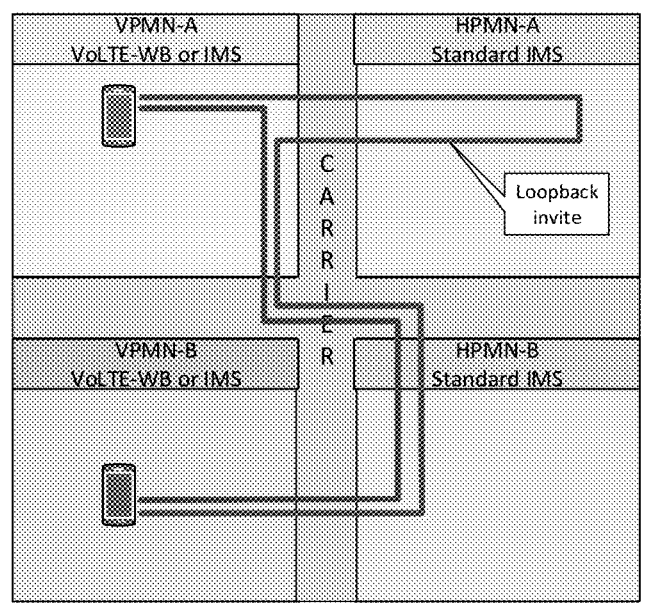

FIGS. 9a-9o show Optimal Media Routing (OMR) and Optimal Signaling Routing (OSR) and are described hereinbelow. Note that in these Figures, the red line represents SIP signalling and the blue line indicates voice over RTP.

Both Subscribers Roaming in Same Visited Network

| OMR/OSR at VPMN-A/B - VoLTE-WB (FIG. 9a) | OMR/OSR at Carrier (FIG. 9b) |
|---|---|
| Signaling and Media are fully optimized as they remain entirely within the VPMN. This is realized by the method of downloading the subscriber profile download at the VPMN VoLTE-WB from HPMN-A and HPMN-B VoLTE-WBs during the registration of UE A and UE B, respectively. | Signaling and Media are partially optimized and remain entirely within the VPMN and the carrier infrastructure. This is realized by the subscriber profile caching mechanism at the carrier VoLTE platform from HPMN-A and HPMN-B VoLTE-WBs during the registration of UE A and UE B, respectively. |
| Media is fully optimized as it remains entirely within the VPMN. Signaling is partially optimized as it does not need to flow via HPMN-B. This is realized by the method of downloading the subscriber profile at the VPMN VoLTE-WB and subscriber profile caching at the carrier VoLTE platform from HPMN-B VoLTE-WB during the registration of UE B. | Media and Signaling are partially optimized as they do not need to flow via HPMN-B. This is realized by the subscriber profile caching mechanism at the carrier VoLTE platform from HPMN-B VoLTE-WB during the registration of UE B. |
| Media and Signaling partially optimized as they do not need to flow via HPMN-A. This is realized by the method of subscriber profile caching at the carrier VoLTE platform from HPMN-A VoLTE-WB during the registration of UE A. | Media partially optimized as it remains entirely within the VPMN and the carrier infrastructure. Signaling partially optimized as it does not need to flow via HPMN-B. This is realized by the method of subscriber profile caching at the carrier VoLTE platform from HPMN-B VoLTE-WB during the registration of UE B. |
| Media and signaling partially optimized as they do not need to flow via HPMN-B. This is realized by the method of subscriber profile caching at the carrier VoLTE platform from HPMN-B VoLTE-WB during the registration of UE B. | |
| In this case optimization is not possible, this is due to the standard LBO-HR model where signaling and media need to flow through VPMN-A/B, HPMN-A and HPMN-B. | In this case optimization is not possible, this is due to the standard LBO-VR model where signaling needs to flow through VPMN-A/B, HPMN-A and HPMN-B and media needs to flow through VPMN-A/B and HPMN-B. |

Each Subscriber Roaming in a Different Visited Network

| OMR/OSR at Carrier (FIG. 9j) | OMR/MT at Carrier (FIG. 9k) |
|---|---|
| Signaling and Media are fully optimized as they remain entirely within the VPMNs. This is realized by subscriber profile caching at the carrier VoLTE platform from HPMN-A and HPMN-B VoLTE-WBs during the registration of UE A and UE B respectively. | Media fully optimized as it remains entirely within the VPMNs. Signaling partially optimized as it does not need to flow via HPMN-B. This is realized by subscriber profile caching at the carrier VoLTE platform from HPMN-B VoLTE-WB during the registration of UE B. |
| MT OMR/OSR at Carrier (FIG. 9l) | MO OMR/OSR at Carrier (FIG. 9m) |
| Signaling and media are partially optimized as they do not need to flow through HPMN-B. This is realized by subscriber profile caching at the carrier VoLTE platform from HPMN-B VoLTE-WB during the registration of UE B. | Media and Signaling partially optimized as they do not need to flow via HPMN-A. This is realized by subscriber profile caching at the carrier VoLTE platform from HPMN-A VoLTE-WB during the registration of UE A. |
| Standard IMS call flow - LBO-HR (FIG. 9n) | Standard IMS call flow - LBO-VR (FIG. 9o) |
| In this case optimization is not possible, this is due to the standard LBO-HR model where signaling and media need to flow through VPMN-A, HPMN-A, HPMN-B and VPMN-B. | In this case optimization is not possible, this is due to the standard LBO-VR model where signaling needs to flow through VPMN-A, HPMN-A, HPMN-B and VPMN-B and media needs to flow through VPMN-A, HPMN-B and VPMN-B. |

Interworking with Legacy

In case of VoLTE break out, a standard VoLTE network requires a dedicated IMS component (MGCF) in order to break IMS traffic to Legacy traffic (TDM, ISDN, VoIP). This MGCF component provides connections between traditional TDM Networks and IMS Networks. The conversion takes place between SS7-ISUP, SIP-I, SIP-T protocols and IMS SIP protocol.

Using the VoLTE-WB, break-out calls are made possible without a MGCF component in the serving network, thereby reducing complexity, cost and time to market by avoiding the integration of this additional network component that is MGCF.

In order to render this break-out functionality, the VoLTE-WB makes use of the standard PBX dial-out capability.

Figure 10A:
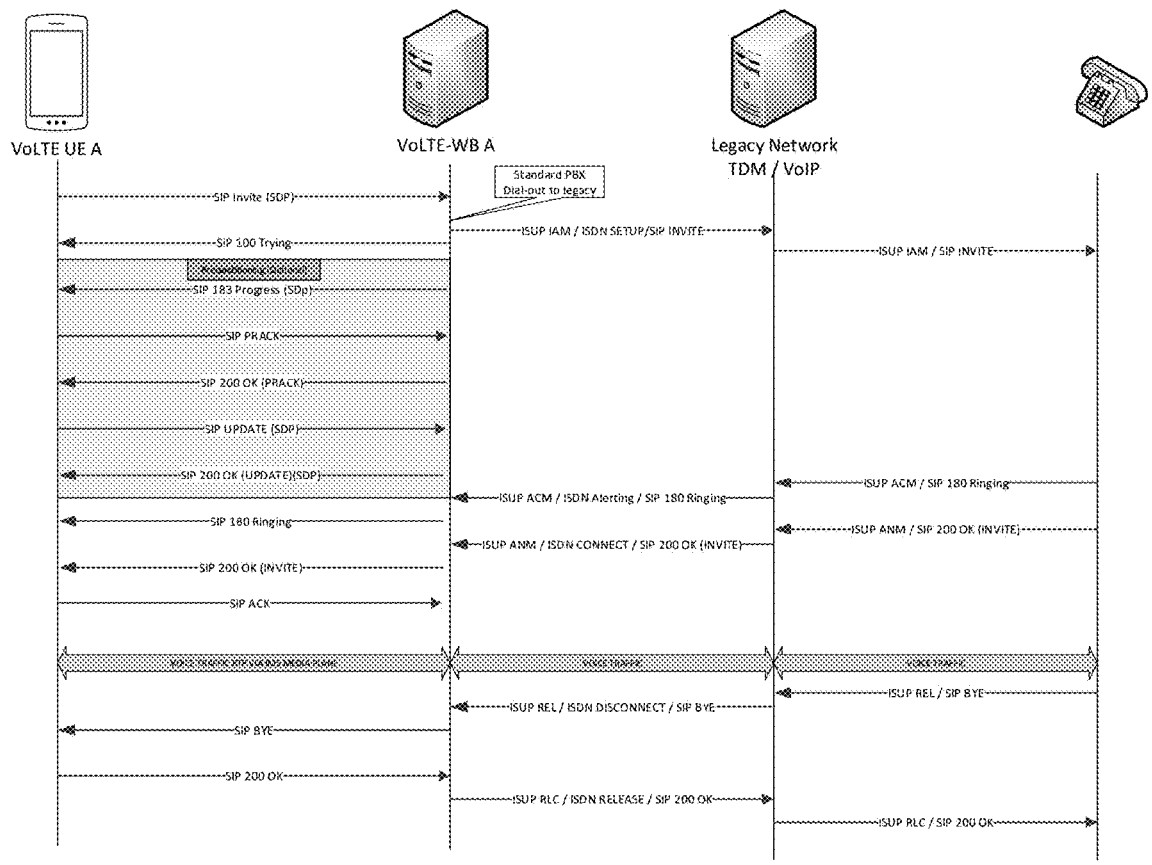
FIG. 10a is a flow chart illustrating the mechanism followed by VoLTE-WB for breaking out calls towards Legacy Networks.
Figure 10B:
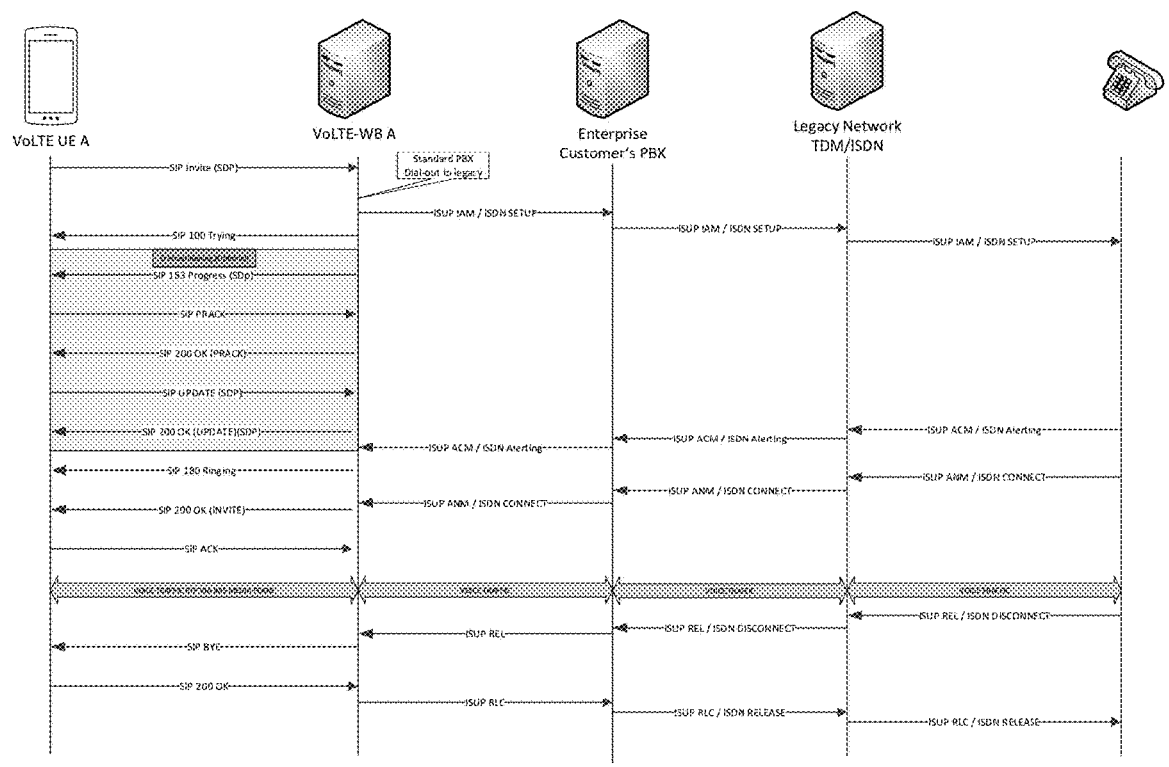
FIG. 10b is a flow chart illustrating the mechanism followed by VoLTE-WB for breaking out calls towards Legacy enterprise PBX (ISDN)

FIGS. 10a and 10b demonstrate the mechanism followed by VoLTE-WB for breaking out calls towards Legacy Networks (ISUP/VoIP) i.e., FIG. 10a or to Legacy enterprise PBX (ISDN) i.e., FIG. 10b. In order to maintain clarity, SIP 100 and SIP ACK messages are omitted from the diagrams towards the legacy networks.

A VoLTE subscriber belonging to VoLTE-WB places a VoLTE MO call and the INVITE arrives at the VoLTE-WB. The VoLTE-WB determines that the call should break-out based on its internal routing logic:
 a. Destination is national legacy interconnect.
 b. Destination belongs to the VoLTE-WB operator but is not registered on the VoLTE-WB.
 c. Destination is a VoLTE-WB subscriber but not currently under VoLTE coverage. This is determined via access domain selection as described hereinbelow.

Mobile number portability scenarios must be addressed on a case by case basis as it depends on its implementation approach.

The SIP messages continue as per the standard VoLTE SIP call flow for a MO call with preconditioning enabled if demanded by UE A. The proposed VoLTE-WB, allows support of pre-conditioning on a call by call basis.

Access Domain Selection for MT Call

When an MT call arrives on the VoLTE-WB, it must determine if the call should be sent to the destination via VoLTE or via legacy CS.

A traditional IMS core will accomplish this task through the use of a T-ADS application server along with T-ADS support on HSS and MME/SGSN. In this solution, the functionality is rendered solely by the VoLTE-WB without any special requirements on the EPC network.

Figure 11:
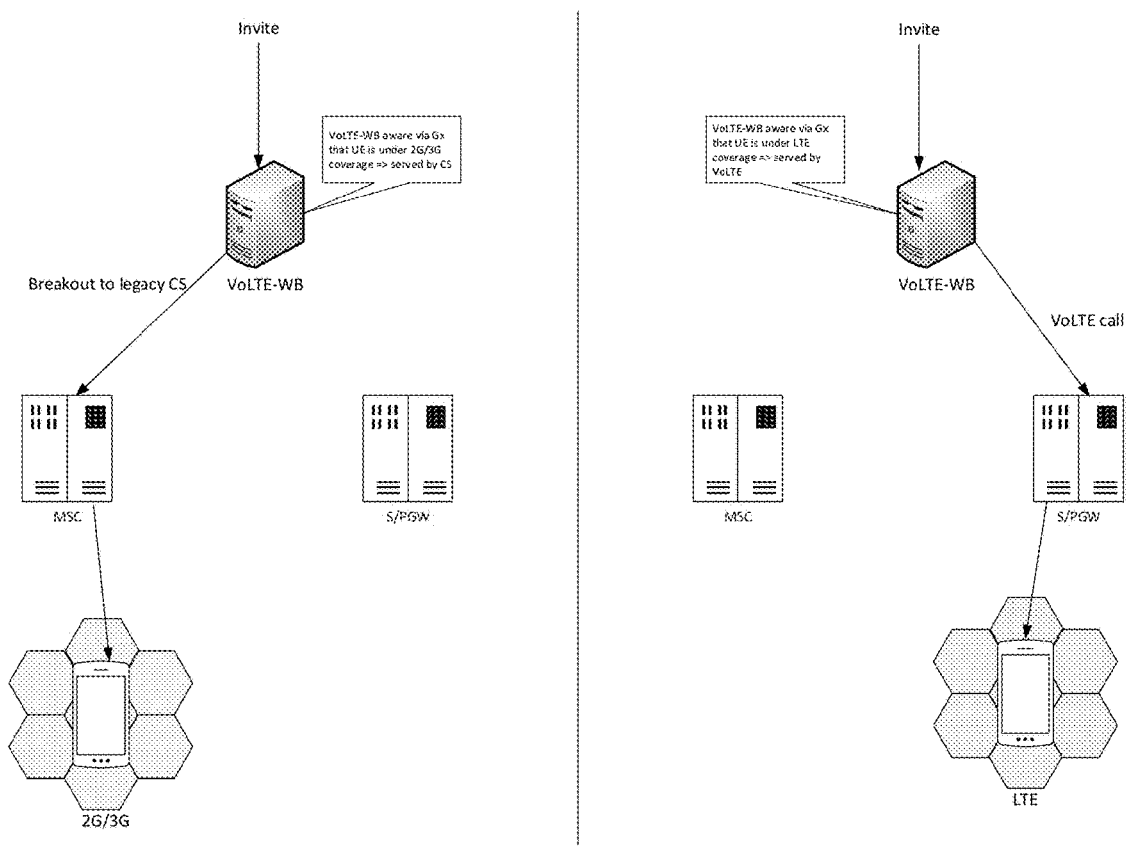
FIG. 11 is a block diagram illustrating access domain selection for MT call.

The VoLTE-WB is kept aware of the UE's current coverage technology through the use of the Gx RAT Change trigger described in the following section. Using this information, the VoLTE-WB can forward any MT call on the appropriate technology (i.e., VoLTE or legacy CS). FIG. 11 illustrates this mechanism.

This solution is valid not only for VoLTE-initiated calls which by default land on the VoLTE-WB, but also for regular break-in calls initiated from the legacy CS network.

To make use of this functionality for break-in calls, a pre-requisite for the legacy network is to route all calls through the VoLTE-WB in order to let it take the appropriate terminating domain decision. An alternative is to let all calls initiated from the legacy network use the existing CSFB mechanism to reach subscribers currently under LTE coverage. The drawback, however, is increased call setup time due to the mandatory handover procedure required by CSFB.

Radio Access Type Tracking

In order to correctly choose the access domain on which a MT call must land, radio access tracking is implemented within the VoLTE-WB as mentioned hereinabove.

In an MNO/MVNO case, a standard Gx interface is required between the PGW and the VoLTE-WB. The PGW must associate the IMS APN's Gx configuration to the VoLTE-WB. The VoLTE-WB will activate the RAT change event trigger in the CCA-I in order to be informed by the PGW of any radio access change.

Figure 12:
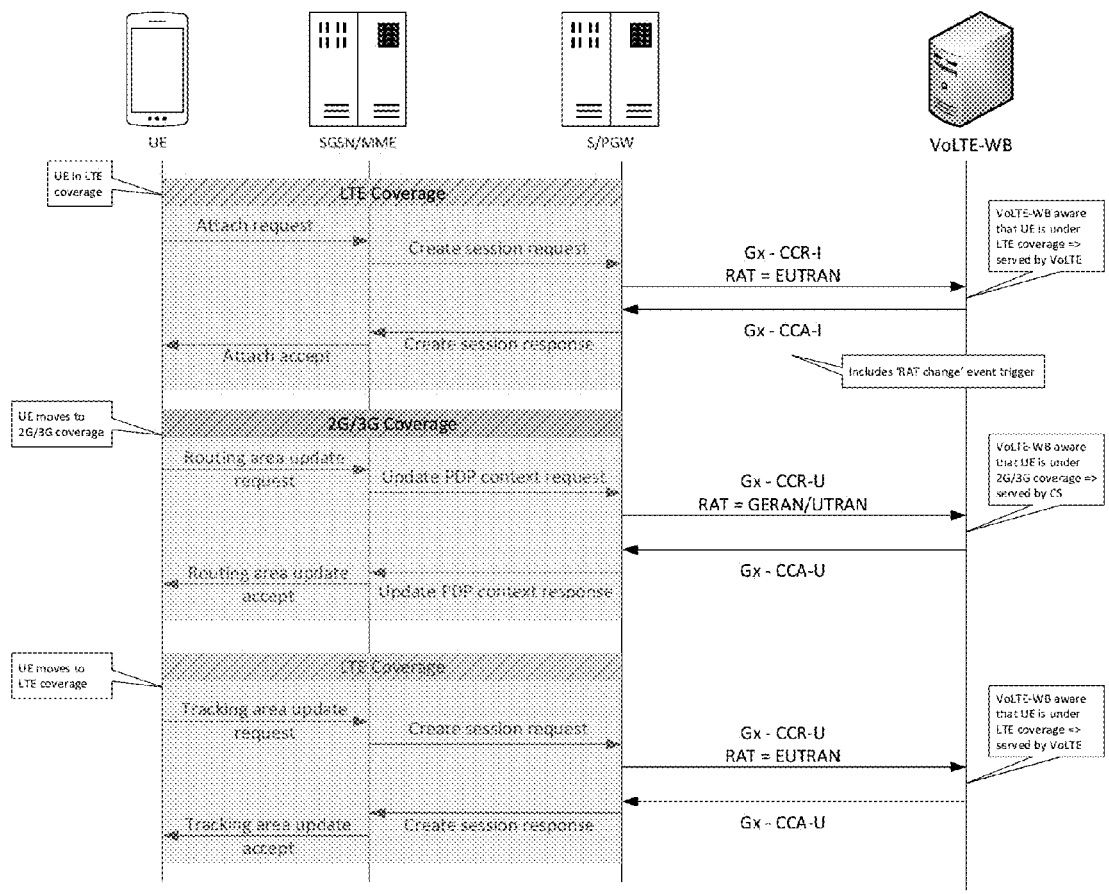
FIG. 12 is a flow chart illustrating radio access type tracking.

As can been seen in FIG. 12, whenever the UE moves between access networks, the PGW is informed by the SGSN or SGW in order to update the context information. As the VoLTE-WB enables the RAT change event trigger, the PGW sends a CCA-U to the VoLTE-WB informing it of the new RAT.

In the enterprise use case, the Gx link might not be available. Therefore, as an alternative, the downloaded client itself will be monitoring any radio access network change and informing the VoLTE-WB of such events.

Voice Call Continuity

When a subscriber with an ongoing VoLTE call falls out of LTE coverage, the call must continue within the target radio technology (i.e., GERAN or UTRAN) using the circuit switched infrastructure. This is called voice call continuity.

In an MNO/MVNO use case, if the serving network supports (e) SRVCC in its MME and MSC Server/MediaGW, then standard IMS (e) SRVCC mechanisms can be used (3GPP 23.216 and 23.237). However, if the serving network is not capable of handling (e) SRVCC, then the locally deployed VoLTE-WB provides a solution for voice call continuity based on radio access type tracking.

The VoLTE-WB detects that a radio access change from LTE to GERAN/UTRAN has occurred through a Gx CCR-U message triggered by the GGSN/PGW. In the enterprise case, the downloaded client informs the VoLTE-WB of the radio access change.

If the subscriber had an ongoing call, the VoLTE-WB sends a re-invite towards the other party in the call and plays an announcement indicating that its peer subscriber is currently in the process of changing radio access type (e.g., voice announcement or special tone). The VoLTE-WB then initiates a call setup towards the circuit switched infrastructure of the serving network as any other breakout call.

Figure 13:
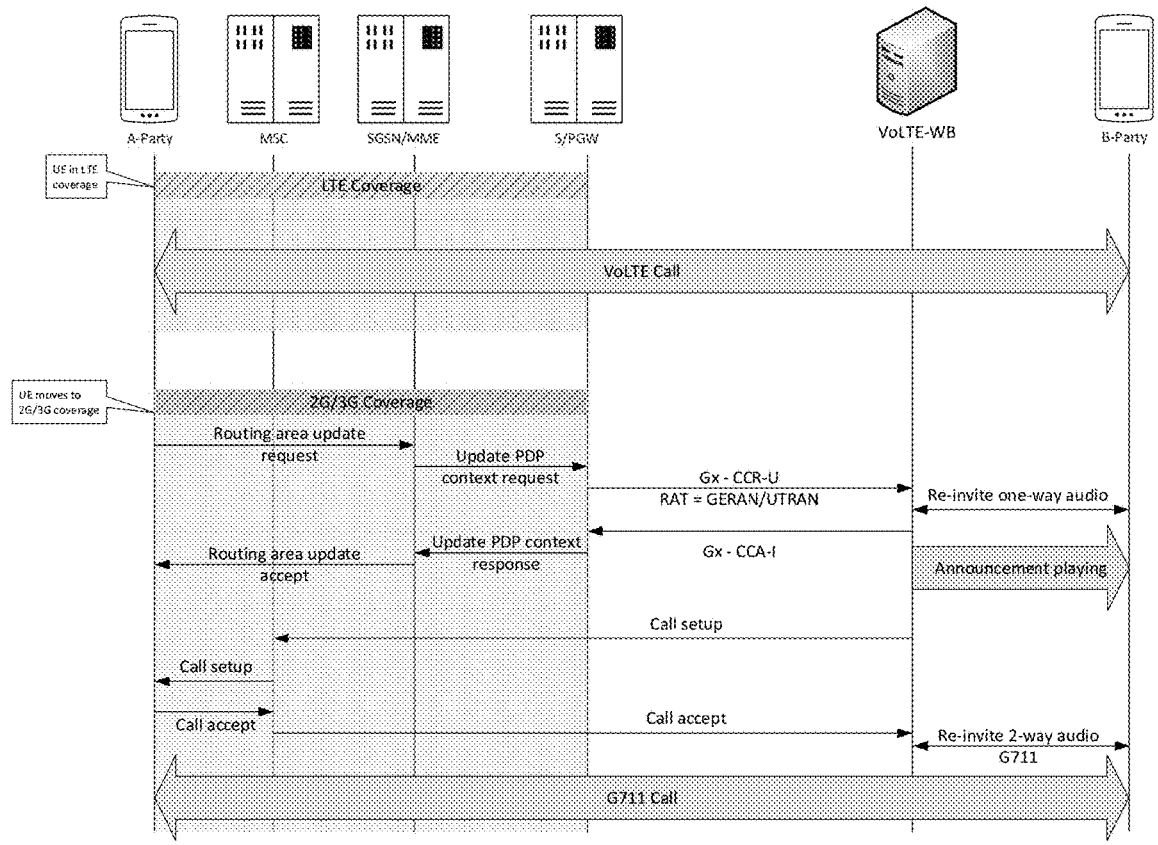
FIG. 13 is a flow chart illustrating voice call continuity.

The moving subscriber then receives this call and, once answered, the VoLTE-WB sends a re-invite to the other party in order to re-establish two-way communication. FIG. 13 illustrates this mechanism.

Although this mechanism provides voice call continuity, the user experience is different from standard (e) SRVCC. With this solution, the moving subscriber receives a call over circuit switched, which must be answered. In (e) SRVCC, the call continues without any interruption.

Rendering VoLTE services through the VoLTE-WB results in almost identical user experience when compared to a standard IMS implementation. The only difference in behavior is witnessed voice call continuity is actuated in the midst of a call when standard (e) SRVCC is not implemented by the serving network. In that case, the moving party receives a call back once the mobility procedure is complete in the target radio network (2G/3G) while the other party receives notification that its peer is currently moving. This contrasts with (e) SRVCC, where mobility is seamless.

The foregoing description is embodied in the following list of features provided by the present invention:
- Centrally enable VoLTE/VoWiFi, thus VoXX, for any sized network (Enterprise, MVNO and MNO) without implementing an IMS core.
- The VoLTE-WB enables the re-use of the current 2G/3G CS roaming model for both signaling and media routing while in standard VoLTE signaling is always routed back towards home network even in LBO-VPMN Routed (i.e., RAVEL)
- Current mobile voice billing architecture can be retained due to the support of the current 2G/3G CS call routing and charging model.
- The VoLTE-WB has been designed to avoid any static subscriber profile provisioning, averting the complexity of additional OSS development and integration. This is made possible through the re-use of the current 2G/3G HLR voice profile, including supplementary services, which is downloaded on demand by the VoLTE-WB.
- Subscriber profile caching at the carrier VoLTE platform enables optimized call routing for some scenarios.
- The VoLTE-WB can make use of a MAP or S6a interface in order to retrieve the authentication vectors from the 2G/3G/EPC HLR/HSS. This is required for IMS AKA authentication during registration. This functionality enables the re-use of currently deployed interfaces without requiring the support, testing, validation and integration of a new interface on the HSS i.e. the Cx interface.
- The VoLTE-WB provides a unique device validation mechanism in case IMS AKA authentication is not possible due to an operator not being able to provision authentication vectors via Cx, S6a or MAP interfaces. This relies on the embedded lite PCRF functionality which enables the VoLTE-WB to be fully aware of the IMSI to UE IP address mapping.
- In a standard IMS implementation, mobile originating calls are routed from the VPMN towards the HPMN using the routing information present in the service route header of the registration's 200 OK message. The VoLTE-WB reduces the complexity of MO call routing by eliminating the use of the service route header for the routing of a mobile originating calls if the HPMN of the subscriber has also deployed a VoLTE-WB. In this case, the visited VoLTE-WB can directly proceed with the interworking leg in line with the 2G/3G CS roaming call model.

The VoLTE-WB provides a novel breakout mechanism eliminating the need of MGCF, but bringing same user experience by leveraging standard PBX dial-out capabilities.

Through the embedded lite PCRF functionality, radio access type tracking is made possible, allowing the VoLTE-WB to implement terminating access domain selection whenever a MT call arrives thereby eliminating the need of T-ADS application server along with T-ADS support on SGSN/MME and HSS. The feature also allows the VoLTE-WB to implement voice call continuity whenever a VoLTE customer in a call leaves LTE coverage in favor of 2G/3G coverage. In this case the call which was initiated under VoLTE needs to continue under CS. In a traditional IMS network, this requires a SCC-AS as well as (e) SRVCC support on both MME and MSC Server. By leveraging the lite PCRF functionality, the VoLTE-WB is able to identify in real-time when a subscriber is changing radio technology and thus initiate the process of migrating the call from VoLTE to CS.

In order for a VoLTE-WB to signal its presence towards the carrier and potentially to a peer VoLTE-WB, it includes the SIP Public Service Identity header in SIP messages.

The VoLTE-WB in combination with the carrier VoLTE platform sets out a new paradigm of edge and cloud computing applied to the VoLTE framework.

The VoLTE-WB provides a flexible system capable of integrating with standard IMS networks as well as other VoLTE-WB networks to provide UNI and NNI capabilities rendering national services, interworking and roaming functionalities.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A method for powering voice over long term evolution (VoLTE) in long term evolution networks, the steps comprising:
   a) centrally enabling a VoLTE/VoWiFi (Voice over WiFi) for any sized network, without implementing an IMS (IP Multimedia System) core;
   b) enabling re-use of a conventional 2G ($2^{nd}$ Generation Mobile Network)/3G ($3^{rd}$ Generation Mobile Network) CS (Circuit Switched) roaming model for both signaling and media routing, so that the complexity of MO (Mobile Originating) call routing is reduced by eliminating the use of a service route header for the routing of a mobile originating calls when the HPMN (Home Public Mobile Network) of the subscriber has also deployed a VoLTE-WB (VoLTE World Bridge);
   c) directly proceeding with an interworking leg in line with said 2G/3G CS roaming call model;
   d) validating user equipment using a MAP (Mobile Application Part) or S6a interface to retrieve authentication vectors from the 2G/3G/EPC HLR/HSS ($2^{nd}$ Generation Mobile Network/$3^{rd}$ Generation Mobile Network/Evolved Packet Core Home Location Register/Home Subscriber Server), enabling the re-use of currently deployed interfaces; and
   e) using a radio access type tracking to determine a domain on which a call must land in order to connect the call to the intended recipient.

2. The method for powering voice over long term evolution (VoLTE) in long term evolution networks in accordance with claim 1, wherein said interface comprises at least one of a MAP or an S6a interface.

3. The method for powering voice over long term evolution (VoLTE) in long term evolution networks in accordance with claim 1, the steps further comprising:
   f) caching a subscriber profile at a carrier VoLTE platform to enable optimized call routing.

4. The method for powering voice over long term evolution (VoLTE) in long term evolution networks in accordance with claim 1, the steps further comprising:
   f) providing a device validation mechanism in case IMS AKA (IP Multimedia System Authentication and Key Agreement) authentication is not possible due to an operator not being able to provision authentication vectors via Cx or MAP interfaces from IMS HSS or 3G HSS.

5. The method for powering voice over long term evolution (VoLTE) in long term evolution networks in accordance with claim 1, the steps further comprising:
   f) implementing terminating access domain selection whenever an MT (Mobile Terminating) call arrives, whereby a T-ADS (Terminating Access Domain Selection) application server is eliminated along with T-ADS support on SGSN (Serving GPRS Support Node)/MME (Mobility and Management Entity) and HSS.

6. The method for powering voice over long term evolution (VoLTE) in long term evolution networks in accordance with claim 1, the steps further comprising:
   f) implementing voice call continuity whenever a VoLTE customer in a call leaves LTE (long term evolution) coverage in favor of 2G/3G coverage by using a call back and call merge method.

7. The method for powering voice over long term evolution (VoLTE) in long term evolution networks in accordance with claim 1, the steps further comprising:
   f) providing an SIP Public Service Identity header of the VoLTE-WB in SIP (Session Initiation Protocol) messages for said VoLTE-WB to signal its presence towards a carrier and to a peer VoLTE-WB so that the carrier network can decide whether to progress the call following the IMS related procedures or to follow the VoLTE-WB method in case a PSI (Public Service Identity) parameter is detected by the carrier network and subsequently progress the call following the optimal method (i.e. 2G/3G CS) as defined in the scope of VoLTE-WB.

8. The method for powering voice over long term evolution (VoLTE) in long term evolution networks in accordance with claim 1, the steps further comprising:
   f) providing means for integrating with standard IMS networks and other VoLTE-WB networks to provide UNI (User to Network Interface) and NNI (Network to Network Interface) capabilities to render national services, interworking, and roaming functionalities.

9. The method for powering voice over long term evolution (VoLTE) in long term evolution networks in accordance with claim 1, wherein no pre-provisioning of the user need be done.

10. The method for powering voice over long term evolution (VoLTE) in long term evolution networks in accordance with claim 1, wherein the 2G/3G circuit switched billing model and the system is preserved.

* * * * *